US012699794B2

(12) United States Patent
Crockett-Grabus

(10) Patent No.: US 12,699,794 B2
(45) Date of Patent: Aug. 4, 2026

(54) SYSTEMS AND METHODS OF FACILITATING CONTROLLING ACCESS TO DATA

(71) Applicant: Gray Systems, Inc., Boston, MA (US)

(72) Inventor: Daryl David Crockett-Grabus, Indian Rocks Beach, FL (US)

(73) Assignee: Gray Systems, Inc., Boston, MA (US)

( * ) Notice: Subject to any disclaimer, the term of this patent is extended or adjusted under 35 U.S.C. 154(b) by 42 days.

(21) Appl. No.: 18/836,772

(22) PCT Filed: Feb. 22, 2023

(86) PCT No.: PCT/US2023/013549

§ 371 (c)(1),
(2) Date: Aug. 8, 2024

(87) PCT Pub. No.: WO2023/163960

PCT Pub. Date: Aug. 31, 2023

(65) Prior Publication Data

US 2025/0181744 A1      Jun. 5, 2025

Related U.S. Application Data

(60) Provisional application No. 63/326,267, filed on Mar. 31, 2022, provisional application No. 63/314,365, filed on Feb. 25, 2022.

(51) Int. Cl.
*H04L 29/06*        (2006.01)
*G06F 21/62*        (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS 9,413,730 B1      8/2016   Narayan et al.
9,928,283 B2      3/2018   Catalano, Sr. et al.
(Continued)

FOREIGN PATENT DOCUMENTS

EP          4059184 A1      9/2022
WO       2022226315 A1      10/2022

OTHER PUBLICATIONS

Azure Data Encryption at rest, Nov. 15, 2022, Microsoft, https://learn.microsoft.com/en-us/azure/security/fundamentals/encryption-atrest.

(Continued)

*Primary Examiner* — Evans Desrosiers
(74) *Attorney, Agent, or Firm* — Dhiraj Jindal; PATENT YOGI LLC

(57)        ABSTRACT

The present disclosure provides a method of facilitating controlling access to data. Moreover, the method may include retrieving, using a storage device, an access control information associated with the data based on a provenance key. Accordingly, the method may include analyzing, using a processing device, the access control information and one or more permissions. Furthermore, the method may include determining, using the processing device, an access allowance associated with the data for an access request based on the analyzing of the access control information and the one or more permissions. Moreover, the method may include transmitting, using a communication device, at least a portion of the data to an entity.

20 Claims, 25 Drawing Sheets

(56) References Cited

U.S. PATENT DOCUMENTS

| 10,839,164 | B1 | | 11/2020 | Shorter et al. | |
| 10,984,122 | B2 | | 4/2021 | Thomas | |
| 12,361,006 | B1 | * | 7/2025 | Brandwine | G06F 21/6254 |
| 2020/0193292 | A1 | | 6/2020 | Weng et al. | |
| 2020/0389495 | A1 | * | 12/2020 | Crabtree | H04L 63/1441 |

OTHER PUBLICATIONS

Data Encryption & Tokenization, Vault, https://www.vaultproject io/use-cases/data-encryption.

\* cited by examiner

- ACCESS REQUEST
- AT LEAST A PORTION OF
  DATA
- MODIFICATION
- ALERT

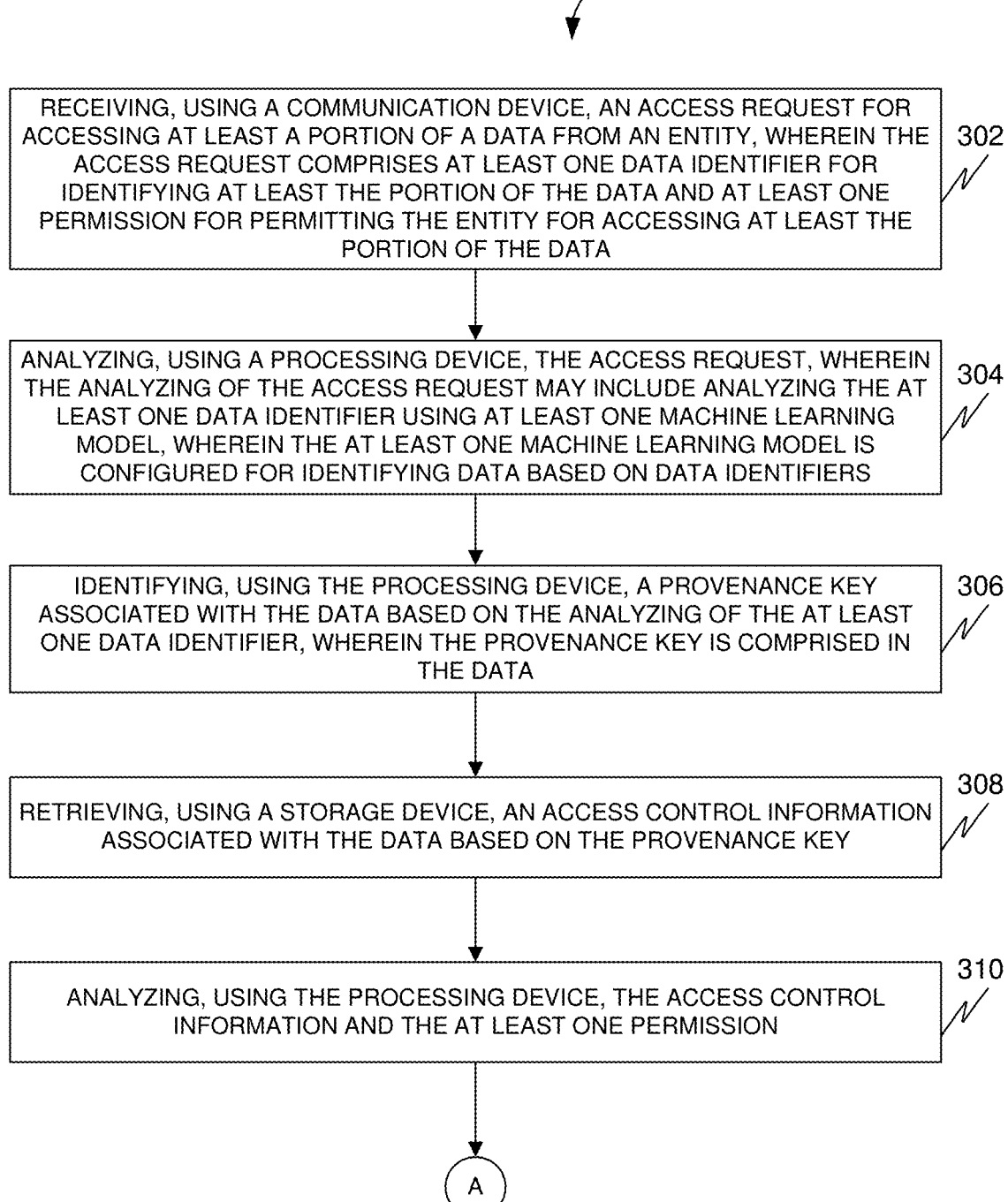

300

RECEIVING, USING A COMMUNICATION DEVICE, AN ACCESS REQUEST FOR ACCESSING AT LEAST A PORTION OF A DATA FROM AN ENTITY, WHEREIN THE ACCESS REQUEST COMPRISES AT LEAST ONE DATA IDENTIFIER FOR IDENTIFYING AT LEAST THE PORTION OF THE DATA AND AT LEAST ONE PERMISSION FOR PERMITTING THE ENTITY FOR ACCESSING AT LEAST THE PORTION OF THE DATA — 302

ANALYZING, USING A PROCESSING DEVICE, THE ACCESS REQUEST, WHEREIN THE ANALYZING OF THE ACCESS REQUEST MAY INCLUDE ANALYZING THE AT LEAST ONE DATA IDENTIFIER USING AT LEAST ONE MACHINE LEARNING MODEL, WHEREIN THE AT LEAST ONE MACHINE LEARNING MODEL IS CONFIGURED FOR IDENTIFYING DATA BASED ON DATA IDENTIFIERS — 304

IDENTIFYING, USING THE PROCESSING DEVICE, A PROVENANCE KEY ASSOCIATED WITH THE DATA BASED ON THE ANALYZING OF THE AT LEAST ONE DATA IDENTIFIER, WHEREIN THE PROVENANCE KEY IS COMPRISED IN THE DATA — 306

RETRIEVING, USING A STORAGE DEVICE, AN ACCESS CONTROL INFORMATION ASSOCIATED WITH THE DATA BASED ON THE PROVENANCE KEY — 308

ANALYZING, USING THE PROCESSING DEVICE, THE ACCESS CONTROL INFORMATION AND THE AT LEAST ONE PERMISSION — 310

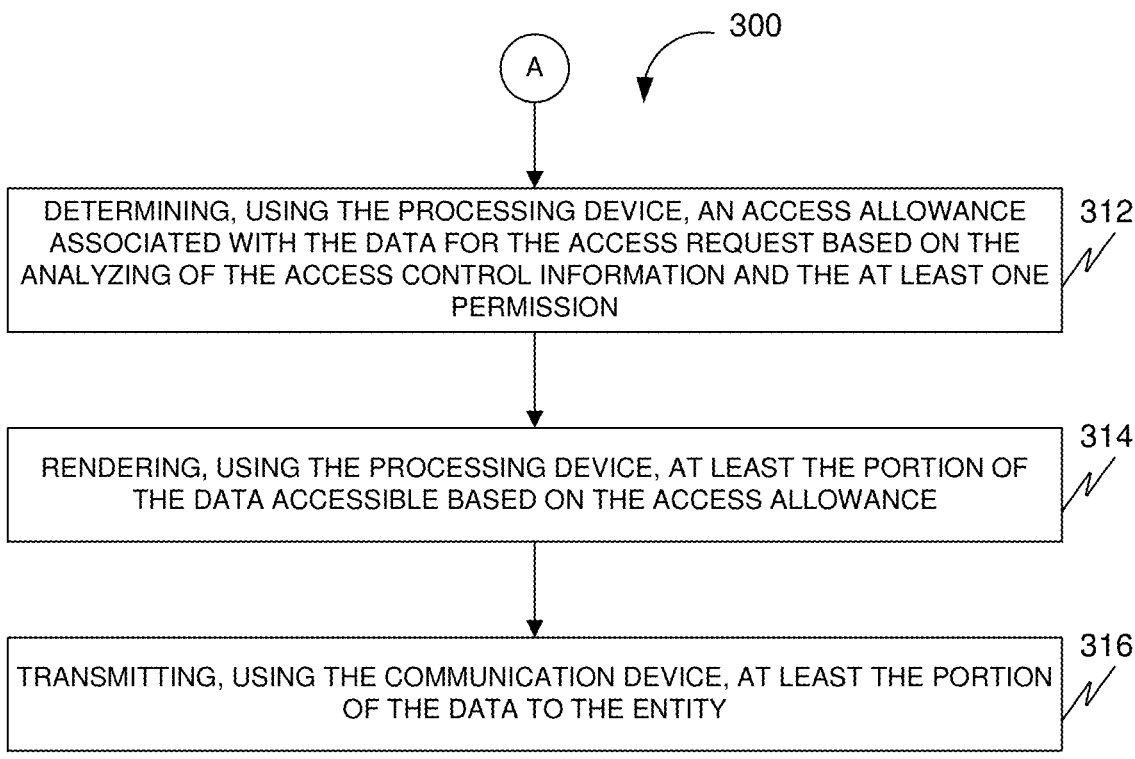

DETERMINING, USING THE PROCESSING DEVICE, AN ACCESS ALLOWANCE ASSOCIATED WITH THE DATA FOR THE ACCESS REQUEST BASED ON THE ANALYZING OF THE ACCESS CONTROL INFORMATION AND THE AT LEAST ONE PERMISSION — 312

RENDERING, USING THE PROCESSING DEVICE, AT LEAST THE PORTION OF THE DATA ACCESSIBLE BASED ON THE ACCESS ALLOWANCE — 314

TRANSMITTING, USING THE COMMUNICATION DEVICE, AT LEAST THE PORTION OF THE DATA TO THE ENTITY — 316

FIG. 3B

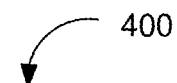

400

RECEIVING, USING THE COMMUNICATION DEVICE, A MODIFICATION IN THE AT LEAST ONE PERMISSION ASSOCIATED WITH THE ENTITY FROM AT LEAST ONE DEVICE ASSOCIATED WITH AT LEAST ONE AUTHORIZED ENTITY

402

RETRIEVING, USING THE STORAGE DEVICE, A PLURALITY OF ACCESS CONTROL INFORMATION ASSOCIATED WITH A PLURALITY OF DATA

404

ANALYZING, USING THE PROCESSING DEVICE, THE PLURALITY OF ACCESS CONTROL INFORMATION BASED ON THE MODIFICATION

406

IDENTIFYING, USING THE PROCESSING DEVICE, AT LEAST ONE OF THE PLURALITY OF DATA IMPACTED BY THE MODIFICATION IN THE AT LEAST ONE AUTHORIZATION ASSOCIATED WITH THE ENTITY BASED ON THE ANALYZING OF THE PLURALITY OF ACCESS CONTROL INFORMATION

408

IDENTIFYING, USING THE PROCESSING DEVICE, A DATA ADMINISTRATOR ASSOCIATED WITH EACH OF AT LEAST ONE OF THE PLURALITY OF DATA USING AN ACCESS CONTROL INFORMATION OF EACH OF AT LEAST ONE OF THE PLURALITY OF DATA BASED ON THE IDENTIFYING OF AT LEAST ONE OF THE PLURALITY OF DATA

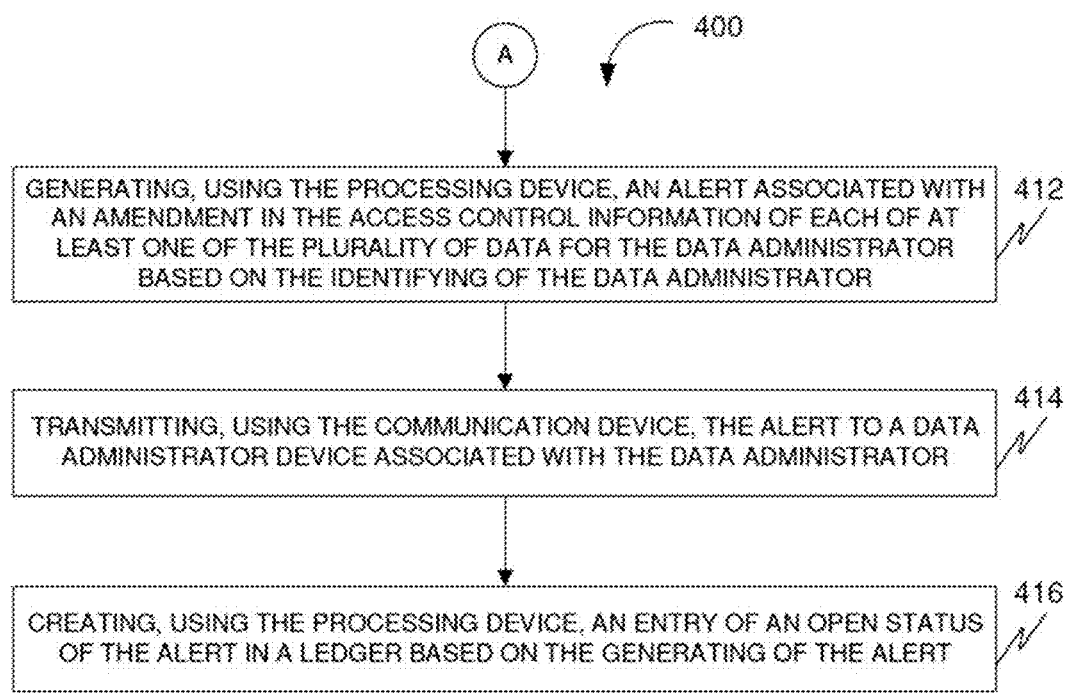

GENERATING, USING THE PROCESSING DEVICE, AN ALERT ASSOCIATED WITH AN AMENDMENT IN THE ACCESS CONTROL INFORMATION OF EACH OF AT LEAST ONE OF THE PLURALITY OF DATA FOR THE DATA ADMINISTRATOR BASED ON THE IDENTIFYING OF THE DATA ADMINISTRATOR    412

TRANSMITTING, USING THE COMMUNICATION DEVICE, THE ALERT TO A DATA ADMINISTRATOR DEVICE ASSOCIATED WITH THE DATA ADMINISTRATOR    414

CREATING, USING THE PROCESSING DEVICE, AN ENTRY OF AN OPEN STATUS OF THE ALERT IN A LEDGER BASED ON THE GENERATING OF THE ALERT    416

FIG. 4B

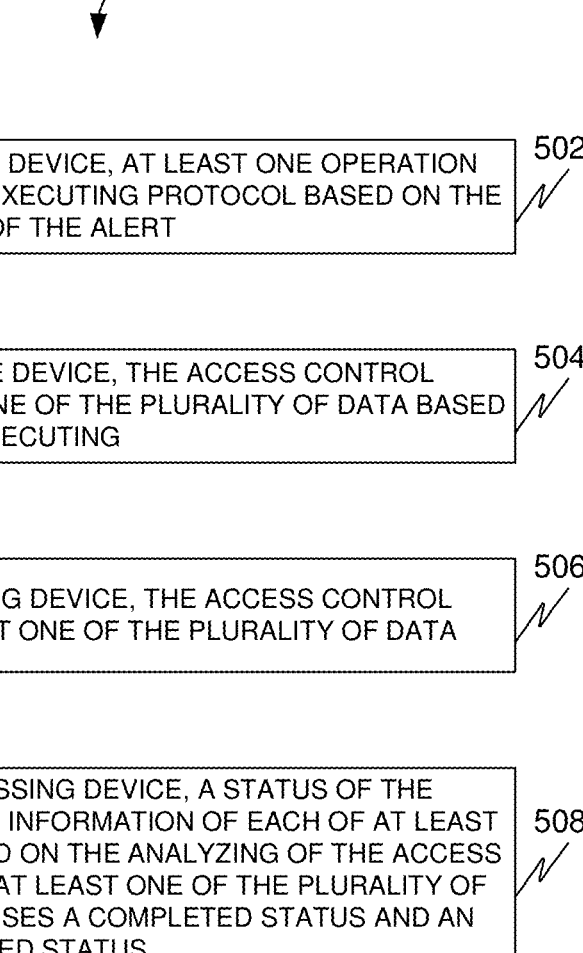

500

EXECUTING, USING THE PROCESSING DEVICE, AT LEAST ONE OPERATION BASED ON AT LEAST ONE OPERATION EXECUTING PROTOCOL BASED ON THE GENERATING OF THE ALERT    502

RETRIEVING, USING THE STORAGE DEVICE, THE ACCESS CONTROL INFORMATION OF EACH OF AT LEAST ONE OF THE PLURALITY OF DATA BASED ON THE EXECUTING    504

ANALYZING, USING THE PROCESSING DEVICE, THE ACCESS CONTROL INFORMATION OF EACH OF AT LEAST ONE OF THE PLURALITY OF DATA    506

DETERMINING, USING THE PROCESSING DEVICE, A STATUS OF THE AMENDMENT IN THE ACCESS CONTROL INFORMATION OF EACH OF AT LEAST ONE OF THE PLURALITY OF DATA BASED ON THE ANALYZING OF THE ACCESS CONTROL INFORMATION OF EACH OF AT LEAST ONE OF THE PLURALITY OF DATA, WHEREIN THE STATUS COMPRISES A COMPLETED STATUS AND AN UNCOMPLETED STATUS    508

GENERATING, USING THE PROCESSING DEVICE, AN ESCALATION OF THE ALERT ASSOCIATED WITH THE AMENDMENT FOR AT LEAST ONE OF AT LEAST ONE ADDITIONAL ENTITY AND THE DATA ADMINISTRATOR ASSOCIATED WITH AT LEAST ONE OF THE PLURALITY OF DATA USING AT LEAST ONE PROTOCOL BASED ON THE COMPLETED STATUS    510

TRANSMITTING, USING THE COMMUNICATION DEVICE, THE ESCALATION TO THE DATA ADMINISTRATOR DEVICE AND AT LEAST ONE ADDITIONAL ENTITY DEVICE ASSOCIATED WITH THE AT LEAST ONE ADDITIONAL ENTITY — 512

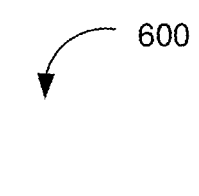

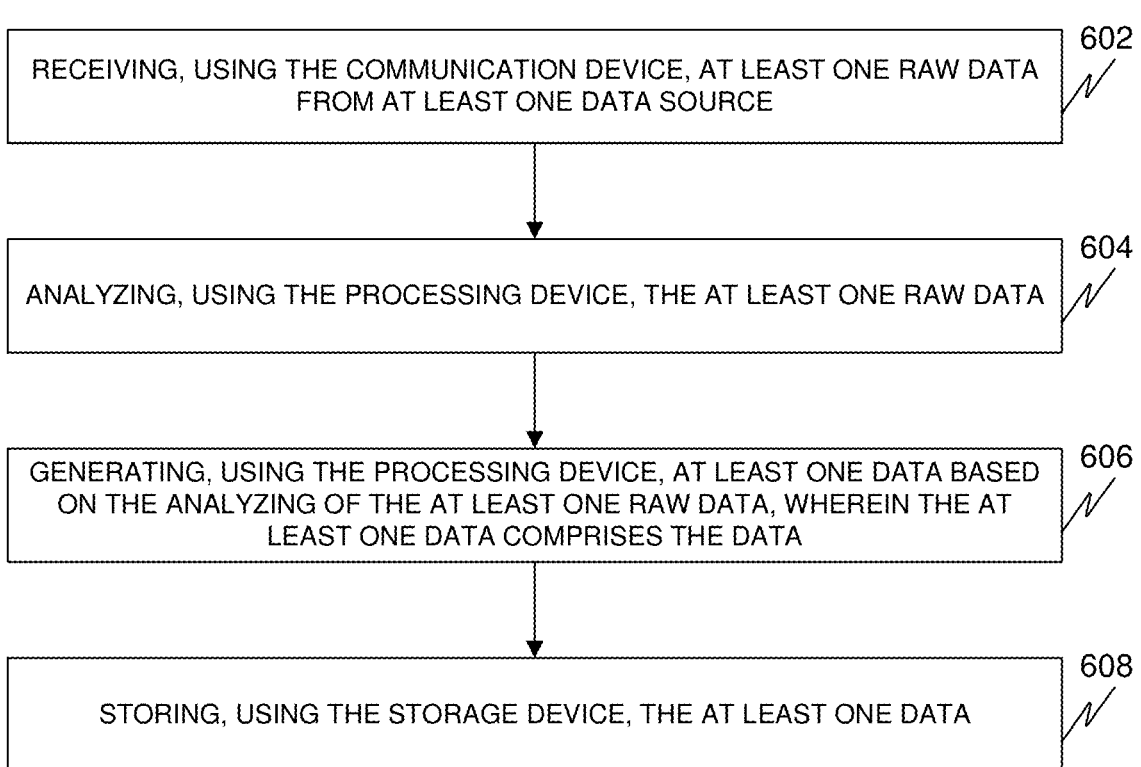

600

RECEIVING, USING THE COMMUNICATION DEVICE, AT LEAST ONE RAW DATA FROM AT LEAST ONE DATA SOURCE
602

ANALYZING, USING THE PROCESSING DEVICE, THE AT LEAST ONE RAW DATA
604

GENERATING, USING THE PROCESSING DEVICE, AT LEAST ONE DATA BASED ON THE ANALYZING OF THE AT LEAST ONE RAW DATA, WHEREIN THE AT LEAST ONE DATA COMPRISES THE DATA
606

STORING, USING THE STORAGE DEVICE, THE AT LEAST ONE DATA
608

FIG. 6

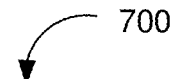

DETERMINING, USING THE PROCESSING DEVICE, AT LEAST ONE DATA CHARACTERISTIC ASSOCIATED WITH THE AT LEAST ONE RAW DATA BASED ON THE ANALYZING OF THE AT LEAST ONE RAW DATA

702

GENERATING, USING THE PROCESSING DEVICE, AT LEAST ONE PROVENANCE KEY FOR THE AT LEAST ONE DATA BASED ON THE DETERMINING OF THE AT LEAST ONE DATA CHARACTERISTIC, WHEREIN THE GENERATING OF THE AT LEAST ONE DATA IS BASED ON THE GENERATING OF THE AT LEAST ONE PROVENANCE KEY, WHEREIN THE AT LEAST ONE DATA COMPRISES THE AT LEAST ONE PROVENANCE KEY

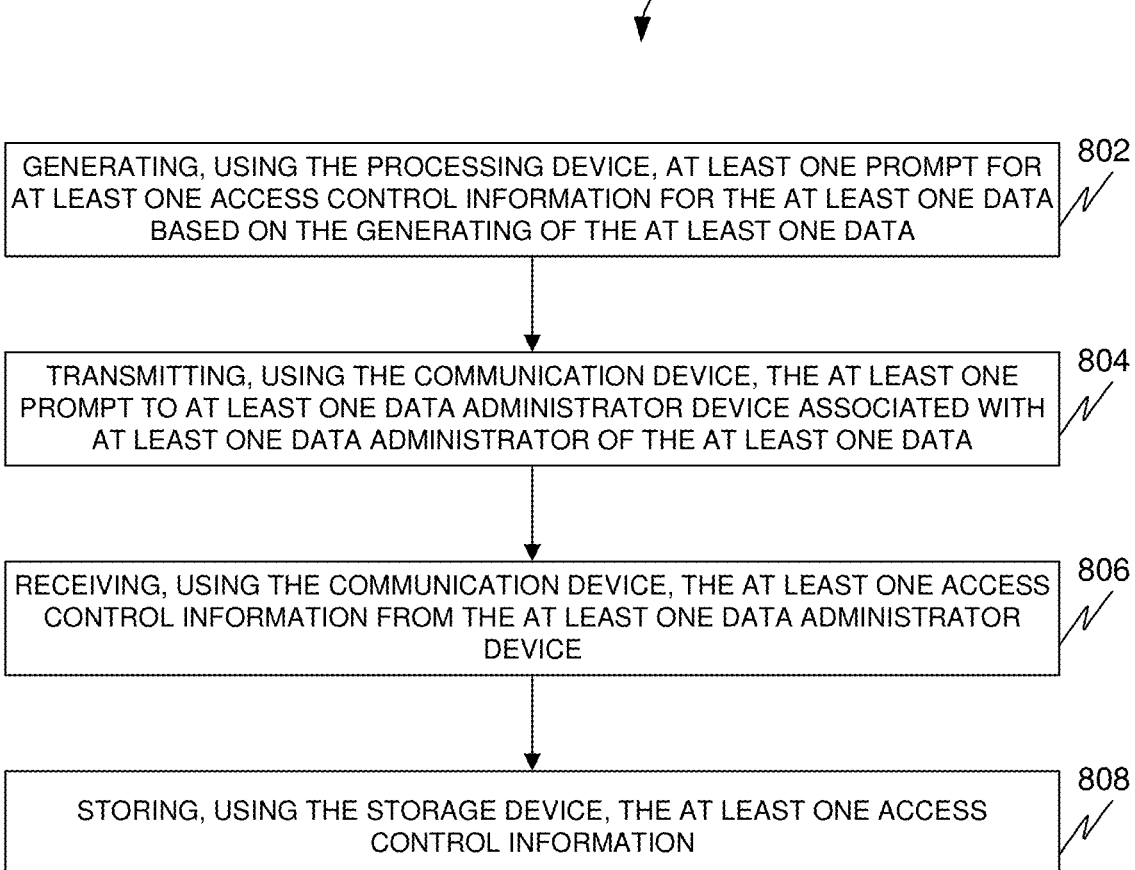

800

GENERATING, USING THE PROCESSING DEVICE, AT LEAST ONE PROMPT FOR AT LEAST ONE ACCESS CONTROL INFORMATION FOR THE AT LEAST ONE DATA BASED ON THE GENERATING OF THE AT LEAST ONE DATA — 802

TRANSMITTING, USING THE COMMUNICATION DEVICE, THE AT LEAST ONE PROMPT TO AT LEAST ONE DATA ADMINISTRATOR DEVICE ASSOCIATED WITH AT LEAST ONE DATA ADMINISTRATOR OF THE AT LEAST ONE DATA — 804

RECEIVING, USING THE COMMUNICATION DEVICE, THE AT LEAST ONE ACCESS CONTROL INFORMATION FROM THE AT LEAST ONE DATA ADMINISTRATOR DEVICE — 806

STORING, USING THE STORAGE DEVICE, THE AT LEAST ONE ACCESS CONTROL INFORMATION — 808

| | Data Field | Original data (Input into business DB) | Designated as PI Data? | Tokenized Data | Token ID | SSBB parse string process | Assembled SSBB String |
|---|---|---|---|---|---|---|---|
| Example 1 | Customer Number | 78995 | No | 78998 | 6336A1 | N/A | Smith-Jamie-783366 |
| | Customer Last Name | Smith | Yes | #$ICAD$5*DF | 6336A1 | Smith | |
| | Customer First Name | James | Yes | #D%GHIE$@33 | 6336A1 | Jimmy | |
| | Customer Phone Number | 783-366-5681 | Yes | DID*CJ$%23 | 6336A1 | 783366 | |
| | Street Name | Welbeck ST | Yes | SDF#$%&|w1 | 6336A1 | Beck | |
| | City | London | Yes | &*%KJS76 | 6336A1 | Lond | |
| | Birth Day (1-31) | 3 | Yes | DSH2341$& | 6336A1 | 3 | Smith-Jamie31-783366 |
| | Month Day (1-12) | 12 | Yes | EIUYW*%h$ | 6336A1 | 12 | |
| | Nickname | Jamie | Yes | IDFGHUTF | 6336A1 | Jamie31 | |
| Example 3 | Customer Number | 78996 | No | 78996 | 6336A2 | N/A | Williams-Robin-883165 |
| | Customer Last Name | Williams | Yes | #$ICAD%S**qw | 6336A2 | Williams | |
| | Customer First Name | Robert | Yes | #D%GHE$uyt | 6336A2 | Bob | |
| | Customer Phone Number | 883-165-7620 | Yes | GEW7523|W# | 6336A2 | 883-165 | |
| | Street Name | 1112 Davies ST | Yes | SDASDS$%&W1 | 6336A2 | Davies St | |
| | City | London | Yes | &AHGSKJ576 | 6336A2 | Lond | |
| | Birth Day (1-31) | 1 | Yes | DSHAI$*& | 6336A2 | 1 | Williams-Robin18-883165 |
| | Month Day (1-12) | 8 | Yes | EIUI+Q%n& | 6336A2 | 8 | |
| | Nickname | Robin | Yes | IDFG123$ | 6336A2 | Robin18 | |

| | Data Field | Original data (Input into business DB) | Designated as PI Data? | Tokenized Data | Token ID | SSBB parse string process | Assembled SSBB String |
|---|---|---|---|---|---|---|---|
| Example 4 | Customer Number | 78997 | No | 78997 | 6336A3 | N/A | Thompson -Lizzy- 987345 |
| | Customer Last Name | Thompson | Yes | 1237AD$5**qw | 6336A3 | Thompson | |
| | Customer First Name | Elizabeth | Yes | #D239HE$#uyt | 6336A3 | Beth | |
| | Customer Phone Number | 987-345-4523 | Yes | GZ#$7523\|w# | 6336A3 | 987-345 | |
| | Street Name | 234 Regent St | Yes | SD09%$%&{wt | 6336A3 | Regent St | |
| | City | London | Yes | 98IASK$76 | 6336A3 | Lond | |
| | Birth Day (1-31) | 5 | Yes | QWEA!$& | 6336A3 | 5 | Thompson -Lizzy56- 987345 |
| | Month Day (1-12) | 6 | Yes | 097FI$Q%*$ | 6336A3 | 6 | |
| | Nickname | Lizzy | Yes | IDF#%dsz | 6336A3 | Lizzy56 | |

| 1712 | 1714 | 1716 | 1718 | 1720 | 1722 |
|---|---|---|---|---|---|
| User Query Input Search | AI Fuzzy Match Logic Prep Process | User Query Input Prepared Search String | AI Fuzzy Match Process Accuracy Calc | Token ID of Matched Record | Top n Match Record(s) De-Tokenized Values |
| N/A | N/A | | N/A | N/A | 78995 |
| Smither | Smither | | 100% | 6336A1 | Smith |
| Jaime | Jaime | | 80% | 6336A1 | James |
| 783-366-5681 | 783-366-5681 | Smith-Jaime-783366 | 100% | 6336A1 | 783-366-5681 |
| Beck ST | Beck ST | | 80% | 6336A1 | Welbeck ST |
| Lond | Lond | | 100% | 6336A1 | London |
| 3 | 3 | | 100% | 6336A1 | 3 |
| 12 | 12 | | 100% | 6336A1 | 12 |
| Jamie31 | Jamie31 | Smith-Jamie31-783366 | 100% | 6336A1 | Jamie31 |
| N/A | N/A | | N/A | N/A | 78996 |
| Williams | Williams | | 100% | 6336A2 | Williams |
| Robin | Robin | | 80% | 6336A2 | Robert |
| 883-165-7620 | 883-165-7620 | Williams-Robin-883165 | 100% | 6336A2 | 883-165-7620 |
| Davies ST | Davies ST | | 80% | 6336A2 | 1112 Davies ST |
| Lond | Lond | | 100% | 6336A2 | London |
| 1 | 1 | | 100% | 6336A2 | 1 |
| 8 | 8 | | 100% | 6336A2 | 8 |
| Robin18 | Robin18 | Williams-Robin18-883165 | 100% | 6336A2 | Robin18 |

| 1712 | 1714 | 1716 | 1718 | 1720 | 1722 |
|------|------|------|------|------|------|
| User Query Input Search | AI Fuzzy Match Logic Prep Process | User Query Input Prepared Search String | AI Fuzzy Match Process Accuracy Calc | Token ID of Matched Record | Top n Match Record(s) De-Tokenized Values |
| N/A | N/A | | N/A | N/A | 78997 |
| Thompson | Thompson | | 100% | 6336A3 | Thompson |
| Lizzy | Lizzy | | 80% | 6336A3 | Elizabeth |
| 987-345-4523 | 987-345-4523 | Thompson-Lizzy-987345 | 100% | 6336A3 | 987-345-4523 |
| 234 Regent St | 234 Regent St | | 80% | 6336A3 | 234 Regent St |
| Lond | Lond | | 100% | 6336A3 | London |
| 5 | 5 | | 100% | 6336A3 | 5 |
| 6 | 6 | | 100% | 6336A3 | 6 |
| Lizzy56 | Lizzy56 | Thompson-Lizzy56-987345 | 100% | 6336A3 | Lizzy56 |

FIG. 20

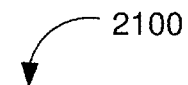

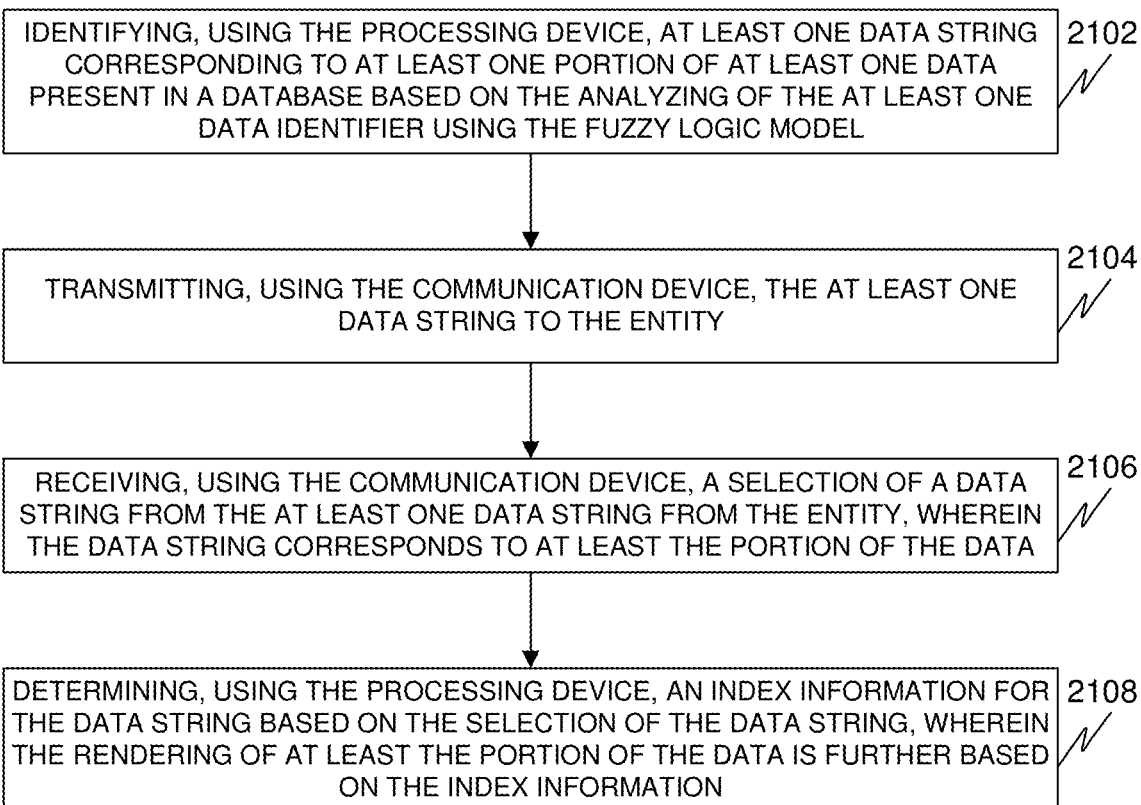

IDENTIFYING, USING THE PROCESSING DEVICE, AT LEAST ONE DATA STRING CORRESPONDING TO AT LEAST ONE PORTION OF AT LEAST ONE DATA PRESENT IN A DATABASE BASED ON THE ANALYZING OF THE AT LEAST ONE DATA IDENTIFIER USING THE FUZZY LOGIC MODEL      2102

TRANSMITTING, USING THE COMMUNICATION DEVICE, THE AT LEAST ONE DATA STRING TO THE ENTITY      2104

RECEIVING, USING THE COMMUNICATION DEVICE, A SELECTION OF A DATA STRING FROM THE AT LEAST ONE DATA STRING FROM THE ENTITY, WHEREIN THE DATA STRING CORRESPONDS TO AT LEAST THE PORTION OF THE DATA      2106

DETERMINING, USING THE PROCESSING DEVICE, AN INDEX INFORMATION FOR THE DATA STRING BASED ON THE SELECTION OF THE DATA STRING, WHEREIN THE RENDERING OF AT LEAST THE PORTION OF THE DATA IS FURTHER BASED ON THE INDEX INFORMATION      2108

FIG. 21

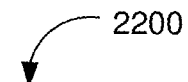

2200

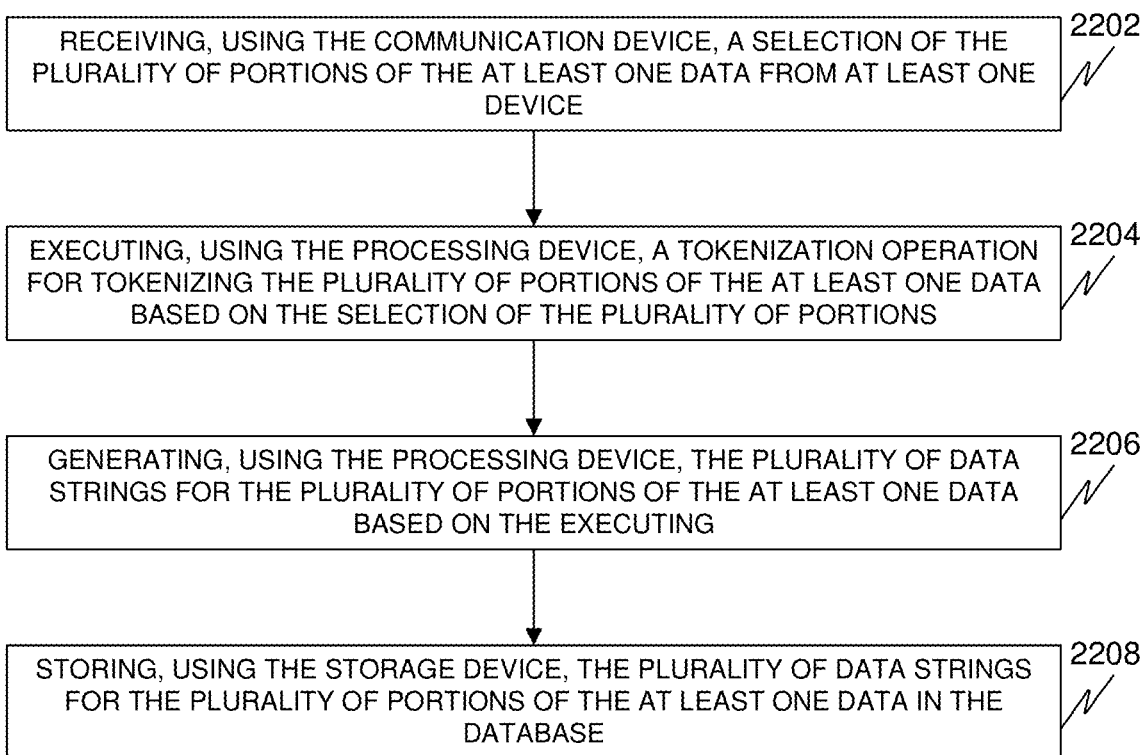

RECEIVING, USING THE COMMUNICATION DEVICE, A SELECTION OF THE PLURALITY OF PORTIONS OF THE AT LEAST ONE DATA FROM AT LEAST ONE DEVICE    2202

EXECUTING, USING THE PROCESSING DEVICE, A TOKENIZATION OPERATION FOR TOKENIZING THE PLURALITY OF PORTIONS OF THE AT LEAST ONE DATA BASED ON THE SELECTION OF THE PLURALITY OF PORTIONS    2204

GENERATING, USING THE PROCESSING DEVICE, THE PLURALITY OF DATA STRINGS FOR THE PLURALITY OF PORTIONS OF THE AT LEAST ONE DATA BASED ON THE EXECUTING    2206

STORING, USING THE STORAGE DEVICE, THE PLURALITY OF DATA STRINGS FOR THE PLURALITY OF PORTIONS OF THE AT LEAST ONE DATA IN THE DATABASE    2208

FIG. 22

SYSTEMS AND METHODS OF FACILITATING CONTROLLING ACCESS TO DATA

CROSS REFERENCE TO RELATED APPLICATIONS

The present application claims a priority to a U.S. Provisional Patent application No. 63/314,365, filed on Feb. 25, 2022 titled "UNIVERSAL PERMISSIONING TOOL FOR DATA ACCESS COMPLIANCE". Further, the present application claims a priority to a U.S. Provisional Patent application No. 63/326,267, filed on Mar. 31, 2022 titled "SECURE SEARCH BLACK BOX TECHNOLOGY".

FIELD OF DISCLOSURE

The present disclosure generally relates to the field of data processing. More specifically, the present disclosure relates to systems and methods of facilitating controlling access to data.

BACKGROUND

The field relating to protecting access to data via a platform, e.g. using keys or access control rules is technologically important to several industries, business organizations, and/or individuals.

Encryption security is a billion-dollar industry that is playing an increasingly important role in modern society. As more and more industries move into digital format, protecting data from unauthorized users and systems is essential. Further, encryption can be used to protect data that is sent, received, and stored using a device. These devices are wide-ranging including smartphones, health trackers, online banking, and more. Cybercrime is becoming more organized, advanced, and inventive as the financial gain from stealing personal information rises. Encryption needs to evolve to meet this challenge. Further, the problem is that data can still be breached if bad actors steal credentials or encryption keys.

Existing techniques of facilitating controlling access to data are deficient in several ways. Current technologies provide an additional layer of data security by swapping real data with useless token placeholders, but this is an insufficient corporate solution.

Businesses need to search their data to access certain personal information (PI) (e.g. to look up customers by name, and phone number); however, tokenized data cannot be interrogated directly because the original data simply no longer exists within the database. Current technologies do not allow businesses to take advantage of tokenization while also providing critical and enhanced searchability.

Further, organizations face significant problems with regard to the security and accessibility of their data. Even though current encryption security providers protect data from unauthorized users and systems, data can still be breached if bad actors steal credentials or encryption keys. Further, some current technologies provide an additional layer of data security by swapping real data with useless token placeholders, but this is an insufficient corporate solution. Businesses need to consume process, analyze, and report on their data however, tokenized data cannot be interrogated directly because the original data simply no longer exists within the database. Due to this difficulty, organizations typically rely primarily on perimeter and endpoint security to prevent unauthorized users' access to sensitive data. Further, most organizations rely on data repositories to aggregate their data such as data warehouses, replicative databases, and data lakes for reporting or downstream processing purposes. These repositories and database copies can receive and house data from a multitude of disparate sources such as enterprise systems and other internal and external databases and applications, where each system or application has its own native set of users and user data access rules. However, when data is aggregated or copied into a new data location or repository, the metadata of the individual data records' origination is often lost, along with the connection to the original data user's access permissions for that data. In this age of escalating data security threats and evolving data privacy and security, enhanced data access control and documentation activities are necessary for maintaining "zero-trust" and other regulatory compliance for the original data sources and the downstream data repositories. However, these disparate permission databases are difficult to maintain and may become uncoordinated with users' right to access data, especially as employees are hired, move, change roles, and are terminated from the organization.

Therefore, there is a need for systems and methods of facilitating controlling access to data that may overcome one or more of the above-mentioned problems and/or limitations.

Summary of Disclosure

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method of facilitating controlling access to data. Furthermore, the method may include receiving, using a communication device, an access request for accessing at least a portion of a data from an entity. Further, the access request comprises one or more data identifiers for identifying at least the portion of the data and one or more permissions for permitting the entity for accessing at least the portion of the data. Moreover, the method may include analyzing, using a processing device, the access request. Further, the analyzing of the access request may include analyzing the one or more data identifiers using one or more machine learning models. Further, the method may include identifying, using the processing device, a provenance key associated with the data based on the analyzing of the one or more data identifiers. Furthermore, the method may include retrieving, using a storage device, an access control information associated with the data based on the provenance key. Moreover, the method may include analyzing, using the processing device, the access control information and the one or more permissions. Accordingly, the method may include determining, using the processing device, an access allowance associated with the data for the access request based on the analyzing of the access control information and the one or more permissions. Furthermore, the method may include rendering, using the processing device, at least the portion of the data accessible based on the access allowance. Moreover, the method may include transmitting, using the communication device, at least the portion of the data to the entity.

The present disclosure provides a system for facilitating controlling access to data. Additionally, the system may include a communication device configured for receiving an access request for accessing at least a portion of a data from an entity. Further, the access request comprises one or more data identifiers for identifying at least the portion of the data and one or more permissions for permitting the entity for accessing at least the portion of the data. The communication device may be configured for transmitting at least the portion of the data to the entity. Furthermore, the system may include a processing device communicatively coupled with the communication device. Moreover, the processing device may be configured for analyzing the access request. Further, the analyzing of the access request may include analyzing the one or more data identifiers using one or more machine learning models. Additionally, the one or more machine learning models may be configured for identifying data based on data identifiers. Accordingly, the processing device may be configured for identifying a provenance key associated with the data based on the analyzing of the one or more data identifiers. Additionally, the provenance key may be comprised in the data. Furthermore, the processing device may be configured for analyzing an access control information and the one or more permissions. Moreover, the processing device may be configured for determining an access allowance associated with the data for the access request based on the analyzing of the access control information and the one or more permissions. Accordingly, the processing device may be configured for rendering at least the portion of the data accessible based on the access allowance. Furthermore, the system may include a storage device communicatively coupled with the processing device. Additionally, the storage device may be configured for retrieving the access control information associated with the data based on the provenance key.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 3A illustrates a flowchart of a method 300 of facilitating controlling access to data, in accordance with some embodiments.

FIG. 3B illustrates a continuation of the flowchart of the method 300 of facilitating controlling access to data, in accordance with some embodiments.

FIG. 4A illustrates a flowchart of a method 400 of facilitating controlling access to data, in accordance with some embodiments.

FIG. 4B illustrates a continuation of the flowchart of the method 400 of facilitating controlling access to data, in accordance with some embodiments.

FIG. 5A illustrates a flowchart of a method 500 of facilitating controlling access to data, in accordance with some embodiments.

FIG. 6 illustrates a flowchart of a method 600 of facilitating controlling access to data, in accordance with some embodiments.

FIG. 7 illustrates a flowchart of a method 700 of facilitating controlling access to data, in accordance with some embodiments.

FIG. 8 illustrates a flowchart of a method 800 of facilitating controlling access to data, in accordance with some embodiments.

FIG. 17 is a tabular representation 1700 of a secure search black box technology (SSBB) of facilitating access to data, in accordance with some embodiments.

FIG. 18 is the tabular representation 1700 of the secure search black box technology (SSBB) of facilitating access to data, in accordance with some embodiments.

FIG. 19 is the tabular representation 1700 of the secure search black box technology (SSBB) of facilitating access to data, in accordance with some embodiments.

FIG. 20 is the tabular representation 1700 of the secure search black box technology (SSBB) of facilitating access to data, in accordance with some embodiments.

FIG. 21 is a flow diagram of a method 2100 for facilitating controlling access to data, in accordance with some embodiments.

FIG. 22 is a flow diagram of a method 2200 for facilitating controlling access to data, in accordance with some embodiments.

DETAILED DESCRIPTION OF DISCLOSURE

Figure 1:
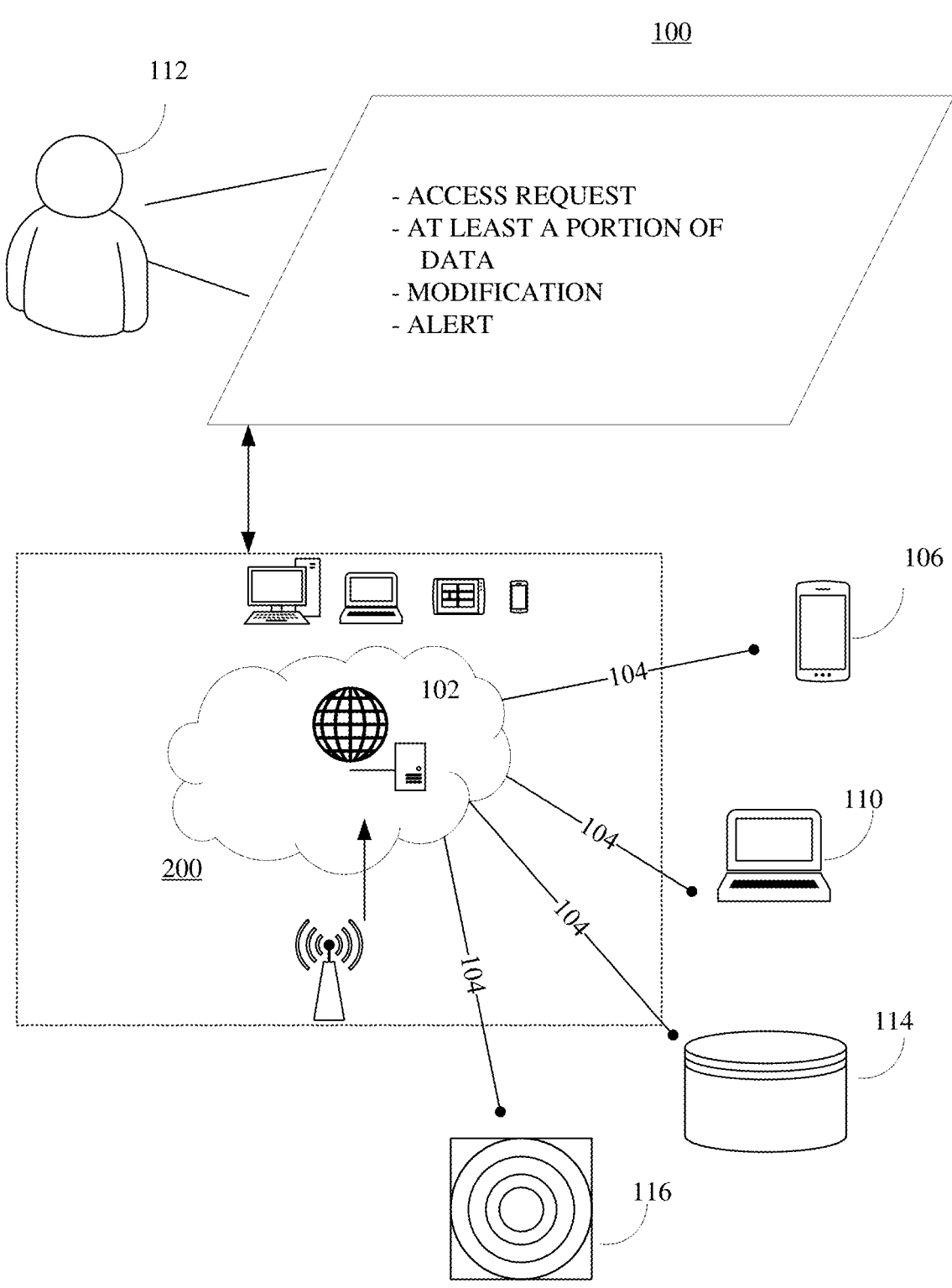
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to systems and methods for facilitating controlling access to data, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, tokenizing, detokenizing, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems for facilitating controlling access to data. Further, the system allows all data-at-rest records to stay tokenized and/or encrypted until specific queries or access requests are made, thus significantly reducing the risk of mass data breaches. Further, disclosed system may allow only specific data records and fields to be accessed, based on the source data system's current access to that same data. Further, disclosed system may reduce the burden of system access maintenance of disparate but connected systems, including the source systems and aggregated data sources (e.g., Enterprise resource planning (ERP) contributes data to Data Lake). Further, disclosed system may support polling of a permission status of connected systems to provide insight into access conflicts and discrepancies and may provide alerts to staff for these discrepancies from security compliance activities.

Further, the disclosed system may be based on a "permissioning key" concept where the system may tag the data record with data provenance, and then use the tag to later allow or deny the decrypting or de-tokenization of that specific data in downstream systems that may consume that data. Further, the disclosed system may use that universal permissioning tool (UPT) to search for and notify of access conflicts across multiple systems for access to the same data in different locations.

Further, Universal Permissioning Tool for Data Access Compliance ("UPT"), an exemplary embodiment of the disclosed system herein may control access to downstream aggregated data, such as data lakes, data warehouses, and other data-at-rest repositories. Further, the system may control the access by reading permissions from the original upstream data-contributing source systems' native permission tables, triggering one or more data access notifications and actions based on a dynamic data access permission resolution schema.

Further, the Universal Permissioning Tool may improve the data access controls of sensitive data, and if used in conjunction with tokenization (or micro-field-level-encryption) may extend the usability and benefits of tokenization/micro-encryption through controlled data access functionality. The UPT may thus allow the necessary use of data without the inherent risk of personal information (PI) or other sensitive data-at-rest exposure by leaving large blocks of data readable should unauthorized users gain unauthorized access to the data by unanticipated means.

Further, UPT may employ a novel method of creating and storing a data provenance key (or "p-key) that may contain relevant information related to the nature and source of the data record being transferred, such as Source System identification (ID), data transfer Job identification (ID), User identification (ID), country (location) identification (ID), Company, Department, division, etc. The p-key may be imbedded in a field as part of the actual data record and may be designed to remain with the data record or meta-data and to be available to downstream queries and to an unlocking method of the Universal Permissioning Tool.

Further, the Universal Permissioning Tool may be applied to both structured and un-structured data. Further, the disclosed system may store the latest data from all source data's native permissions tables. Further, the disclosed system may serve as a central repository for roles and permissions for all related organizational systems. Further, the disclosed system may store override and conflict resolution rules collected via human input or determined programmatically by the UPT. Further, the disclosed system may act as a gatekeeper to sensitive data by triggering data access, decryption, or de-tokenization on requested data if permission access is granted, using Synchronous Security Keys or other decryption key storage methods. Further, the disclosed system may log all access requests, process flows followed, and resulting disposition to Audit and Compliance Logs. Further, the disclosed system may serve as a first system of record for organizational change to enable quick access to one universal database of all user system access identifications (IDs) and permissioning that may save time in securing and managing the organizations' digital assets. Further, the disclosed system may notify other systems' security administrators of recent changes to user roles and status, and requests two-factor authentication response and notification back when the change/notice is resolved. Further, the disclosed system may send reminders and escalates when those notifications are not received, indicating that a required update to a system's access has not been made. Further, the disclosed system may use artificial intelligence (AI) to monitor and flag discrepancies in permission levels across the enterprise, looking for improvements in role parity and possible nefarious actions. Further, the disclosed system may reduce the time and cost of data access compliance and documentation by automating the majority of processing for data aggregated repositories. Further, the disclosed system may significantly reduce the risk of data breach exposure by allowing data to remain tokenized/encrypted/unreadable unless the dynamic near-real-time access permission is resolved favorably.

Further, the disclosed system may be associated with a data-security software system that may keep tokenized data at rest secure when executing queries and searches to prevent fraud and give protection against cyber attacks. Further, the disclosed system may extend the usability and benefits of tokenization through controlled search and query functionality without the inherent risk of PI data-at-rest exposure. Further, the disclosed system may employ a novel method for searching tokenized data by constructing and storing search string elements in advance. Further, users may first input a data search request. Then, AI fuzzy logic associated with the disclosed system may determine potential matches against the pre-stored strings. These two actions are performed within a highly secure digital container inaccessible by users, batch files (.bat file), or any other unauthorized system. Queries performed within the software application may be pseudonymized, logged, and analyzed; additionally, queries may be quantified and monitored for accuracy, irregularities, and malicious patterns. Continuous improvement may be achieved through AI and machine-learning functionality.

Further, company systems may be often constrained by their native systems' software search capability. Further, the disclosed system may offer improved additional search capability without costly software development or system replacement.

Further, the disclosed system may integrate with commercially available tokenization software. Further, the disclosed system may have access to the logic and field-level token rules from a Commercial Token System (CTS) and may keep this information accessible in some part of the system (admin function area). Further, designated sensitive data may be tokenized and stored in a vault that is accessible by a secure search black box (SSBB). Further, the disclosed system may be based on a configurable set of rules that dictate what fields are part of the SSBB stored searchable string(s) and the format of those fields.

Further, the disclosed system may allow for new records to enter the Tokenized Database (TDB), and the system may "grab" the data record and parse out segments of the data in accordance with storage rules.

Further, the disclosed system may use symmetric encryption, asymmetric encryption, or any other variations known in the art. Further, the disclosed system may use Data Encryption Standard (DES), Triple DES, Rivest-Shamir-Adleman (RSA), Advanced Encryption Standard (AES), TwoFish, or any other variations known in the art.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, entities, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
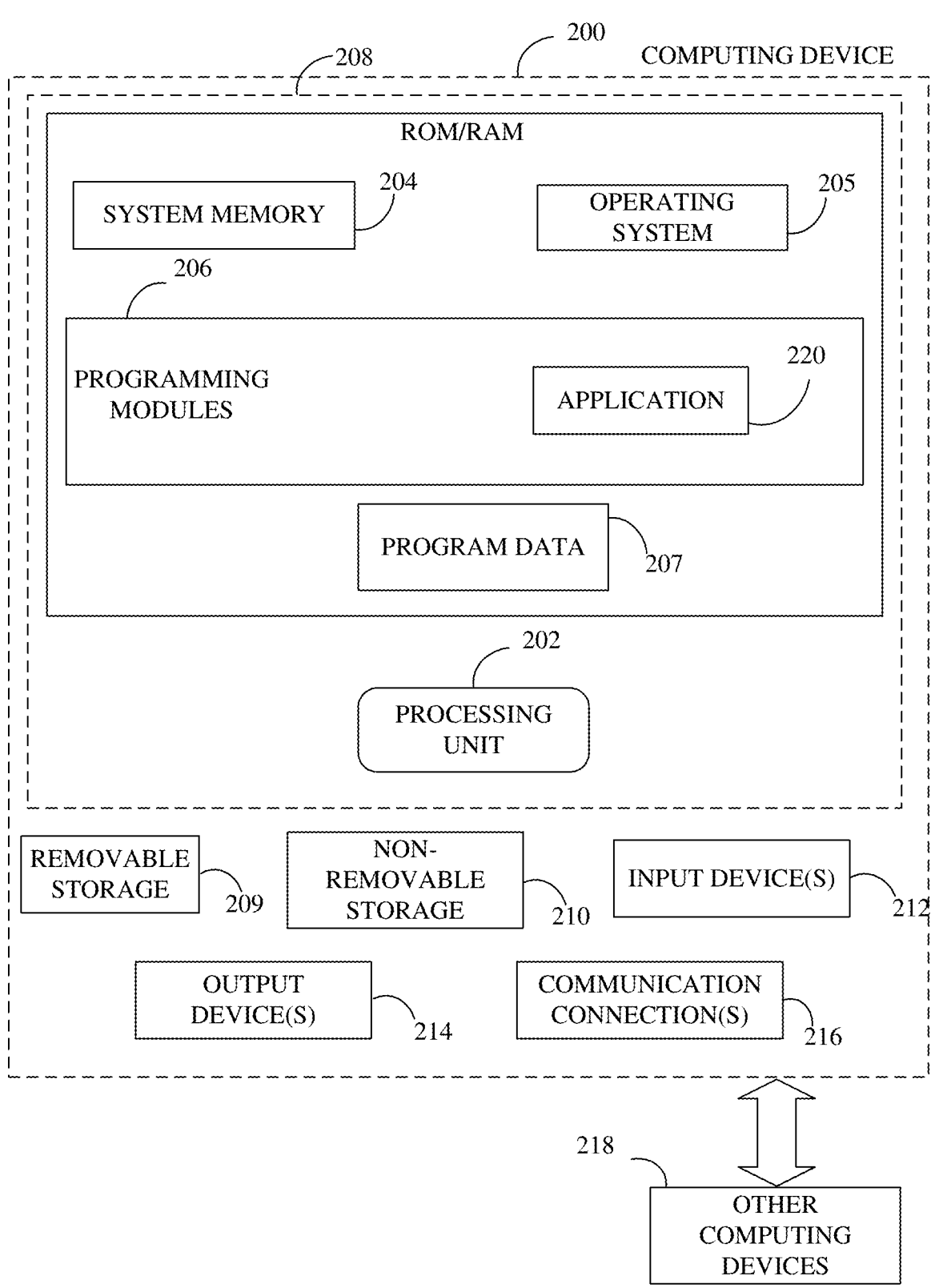
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

FIG. 3A and FIG. 3B illustrate a flowchart of a method 300 of facilitating controlling access to data, in accordance with some embodiments.

Accordingly, the method 300 may include a step 302 of receiving, using a communication device 902, an access request for accessing at least a portion of a data from an entity. Moreover, the access request includes one or more data identifiers for identifying at least the portion of the data and one or more permissions for permitting the entity for accessing at least the portion of the data. Further, the data may include at least one field. Further, the data may include at least one data element corresponding to the at least one field. Further, the at least the portion of the data corresponds to a data element present in a field of the data. Further, the data may include a data record. Further, the entity may include a computing device, a client device, etc. Further, the entity may include a user such as an individual, an institution, an organization, etc. Further, the entity may generate the access request using a software application such as a query application, a reporting tool, an interface, etc. Further, the one or more data identifiers may include name, type, etc. Further, the one or more permissions may include an authorization for the entity to access the data. Further, the one or more permissions for the entity to access the data may include on at least one access identification of the entity. Further, the at least one access identification may include a location (country, state, etc.), a company, a division, a department, an employment status, etc. of the entity. Additionally, the method 300 may include a step 304 of analyzing, using a processing device 904, the access request. Further, the analyzing of the access request may include analyzing the one or more data identifiers using one or more machine learning models. Moreover, the one or more machine learning models may be configured for identifying data based on data identifiers. Also, the method 300 may include a step 306 of identifying, using the processing device 904, a provenance key (such as data provenance key, p-key, etc.) associated with the data based on the analyzing of the one or more data identifiers. Moreover, the provenance key may be comprised in the data. Further, the provenance key may be comprised in the data as a field of the data. Further, the method 300 may include a step 308 of retrieving, using a storage device 906, an access control information associated with the data based on the provenance key. Further, the access control information may include source system permissioning tables, permission rules, permission conflict rules and exception rules, etc. Further, the access control information of the data may include one or more allowed access identifications of entities that may access the data. Further, the one or more allowed access identifications may include one or more allowed locations (countries, states, etc.), one or more allowed companies, one or more allowed divisions, one or more allowed departments, one or more allowed employment statuses, etc. Additionally, the method 300 may include a step 310 of analyzing, using the processing device 904, the access control information and the one or more permissions.

Further, the analyzing of the access control information and the one or more permissions may include validating the one or more permissions of the entity to access at least the portion of the data using the access control information. Further, the analyzing of the access control information and the one or more permissions may include comparing at least one access identification with the one or more allowed access identifications. Also, the method 300 may include a step 312 of determining, using the processing device 904, an access allowance associated with the data for the access request based on the analyzing of the access control information and the one or more permissions. Further, the access allowance may be a binary decision about whether or not the data should be allowed to be accessed as part of this particular access request (data request). Further, the method 300 may include a step 314 of rendering, using the processing device 904, at least the portion of the data accessible based on the access allowance. Further, the rendering may include retrieving at least the portion of the data. Further, the rendering may include making at least the portion of the data accessible based on the retrieving. Further, in an embodiment, the retrieving of at least the portion of the data may include retrieving at least the portion of the data from a distributed ledger. Further, in an instance, the rendering may include detokenizing at least the portion of the data using a synchronous security key. Further, in an instance, the rendering may include decrypting at least the portion of the data using a decryption key. Further, the rendering of at least the portion of the data makes at least the portion of the data readable to the entity. Additionally, the method 300 may include a step 316 of transmitting, using the communication device 902, at least the portion of the data to the entity.

FIG. 4A and FIG. 4B illustrate a flowchart of a method 400 of facilitating controlling access to data, in accordance with some embodiments.

Further, in some embodiments, the method 400 may include a step 402 of receiving, using the communication device 902, a modification in the one or more permissions associated with the entity from one or more devices (such as one or more devices 1002) associated with one or more authorized entities. Further, the modification corresponds to a change in at least one of a role and a status of the entity (user). Further, the modification may include a change in the authorization of the entity to access one or more data. Further, the one or more devices may include computing devices, client devices, etc. Further, the one or more authorized entities may include an individual, an institution, an organization, etc. Additionally, the method 400 further may include a step 404 of retrieving, using the storage device 906, two or more access control information associated with two or more data. Additionally, the method 400 further may include a step 406 of analyzing, using the processing device 904, the two or more access control information based on the modification. Additionally, the method 400 further may include a step 408 of identifying, using the processing device 904, one or more of the two or more data impacted by the modification in the one or more authorizations associated with the entity based on the analyzing of the two or more access control information. Additionally, the method 400 may include a step 410 of identifying, using the processing device 904, a data administrator associated with each of one or more of the two or more data using an access control information of each of one or more of the two or more data based on the identifying of one or more of the two or more data. Further, the data administrator may include a system security administrator, a source system administrator, etc. Further, the data administrator may be a user.

Additionally, the method 400 may include a step 412 of generating, using the processing device 904, an alert associated with an amendment in the access control information of each of one or more of the two or more data for the data administrator based on the identifying of the data administrator. Additionally, the method 400 may include a step 414 of transmitting, using the communication device 902, the alert to a data administrator device (such as data administrator device 1004) associated with the data administrator. Additionally, the method 400 may include a step 416 of creating, using the processing device 904, an entry of an open status of the alert in a ledger based on the generating of the alert. Further, in an embodiment, the ledger may be a distributed ledger associated with a blockchain. Further, in an embodiment, the method 400 may include determining, using the processing device 904, the amendment in the access control information of each of one or more of the two or more data using one or more first machine learning models. Further, the generating of the alert may be based on the determining of the amendment.

Figure 5B:
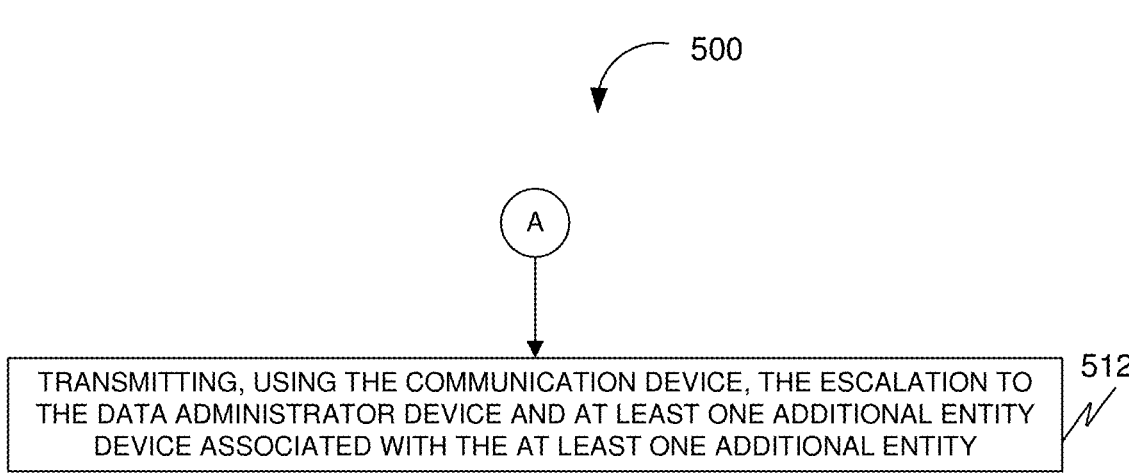
FIG. 5B illustrates a continuation of the flowchart of the method 500 of facilitating controlling access to data, in accordance with some embodiments.

FIG. 5A and FIG. 5B illustrate a flowchart of a method 500 of facilitating controlling access to data, in accordance with some embodiments.

Accordingly, in some embodiments, the method 500 may include a step 502 of executing, using the processing device 904, one or more operations based on one or more operation executing protocols based on the generating of the alert. Further, the one or more operations may include checking the access control information of each of one or more of the two or more data for the amendment. Accordingly, the method 500 may include a step 504 of retrieving, using the storage device 906, the access control information of each of one or more of the two or more data based on the executing. Accordingly, the method 500 may include a step 506 of analyzing, using the processing device 904, the access control information of each of one or more of the two or more data. Accordingly, the method 500 may include a step 508 of determining, using the processing device 904, a status of the amendment in the access control information of each of one or more of the two or more data based on the analyzing of the access control information of each of one or more of the two or more data. Further, the status includes a completed status and an uncompleted status. Accordingly, the method 500 may include a step 510 of generating, using the processing device 904, an escalation of the alert associated with the amendment for one or more of one or more additional entities and the data administrator associated with one or more of the two or more data using one or more protocols based on the completed status. Further, the one or more protocols may be pre-determined escalation and orchestration protocols. Further, the method 500 may include a step 512 of transmitting, using the communication device 902, the escalation to the data administrator device and one or more additional entity devices associated with the one or more additional entities. Further, the one or more additional entities may include a supervisor of the data administrator, etc. Further, the data administrator device and the one or more additional entity devices may include computing devices, client devices, etc.

In some embodiments, the method 500 may further include creating, using the processing device 904, an entry of a closed status of the alert in the ledger based on the completed status.

FIG. 6 illustrates a flowchart of a method 600 of facilitating controlling access to data, in accordance with some embodiments.

Further, the method 600 may include a step 602 of receiving, using the communication device 902, one or more raw data from one or more data sources. Further, the one or more data sources may include a computing device, a client device, etc. Further, the one or more data sources may include a source system. Further, the receiving of the one or more raw data may include receiving the one or more raw data via an application programming interface (API), an electronic data interchange (EDI), an enterprise service bus (ESB), or other common commercial data transfer method from the one or more data sources. Further, the one or more raw data may be data-at-rest. Additionally, the method 600 may include a step 604 of analyzing, using the processing device 904, the one or more raw data. Further, the analyzing of the one or more raw data may include processing the one or more raw data and performing one or more data transformations to the one or more raw data according to one or more preset data rules. Further, the analyzing of the one or more raw data may include performing data quality checks against the one or more preset data rules using one or more data quality and validation rules. Further, the analyzing of the one or more raw data may include partially or fully encrypting the one or more raw data. Further, the analyzing of the one or more raw data may include partially or fully tokenizing the one or more raw data. Also, the method 600 further may include a step 606 of generating, using the processing device 904, one or more data based on the analyzing of the one or more raw data. Further, the one or more data may not be readable. Furthermore, the one or more data includes the data. Further, the method 600 further may include a step 608 of storing, using the storage device 906, the one or more data. Further, in an embodiment, the storing of the one or more data may include storing the one or more data in a distributed ledger.

In some embodiments, the analyzing of the one or more raw data includes tokenizing the one or more raw data. Accordingly, the generating of the one or more data may be further based on the tokenizing.

In some embodiments, the rendering of at least the portion of the data includes detokenizing at least the portion of the data using a security key based on the tokenizing.

FIG. 7 illustrates a flowchart of a method 700 of facilitating controlling access to data, in accordance with some embodiments.

Accordingly, the method 700 may include a step 702 of determining, using the processing device 904, one or more data characteristics associated with the one or more raw data based on the analyzing of the one or more raw data. Further, the one or more data characteristics may include a source system identification (ID), a data transfer job identification (ID), a user identification (ID), a company identification (ID), a department identification (ID), a division identification (ID), a country identification (ID), etc. Furthermore, the method 700 may include a step 704 of generating, using the processing device 904, one or more provenance keys for the one or more data based on the determining of the one or more data characteristics. Further, the one or more provenance keys for the one or more data may include the one or more data characteristics of the one or more data. Additionally, the generating of the one or more data may be based on the generating of the one or more provenance keys. Additionally, the one or more data includes the one or more provenance keys.

FIG. 8 illustrates a flowchart of a method 800 of facilitating controlling access to data, in accordance with some embodiments.

Further, the method 800 may include a step 802 of generating, using the processing device 904, one or more prompts for one or more access control information for the one or more data based on the generating of the one or more data. Additionally, the method 800 further may include a step 804 of transmitting, using the communication device 902, the one or more prompts to one or more data administrator devices (such as one or more data administrator devices 1006) associated with one or more data administrators of the one or more data. Also, the method 800 further may include a step 806 of receiving, using the communication device 902, the one or more access control information from the one or more data administrator devices. Further, the method 800 may include a step 808 of storing, using the storage device 906, the one or more access control information.

In some embodiments, the entity includes one or more users. Also, the receiving of the access request for accessing at least the portion of the data from an entity includes receiving the access request for accessing at least the portion of the data from the one or more user devices associated with the one or more users. Also, the one or more user devices may be configured for generating the one or more users based on an input from the one or more users.

Figure 9:
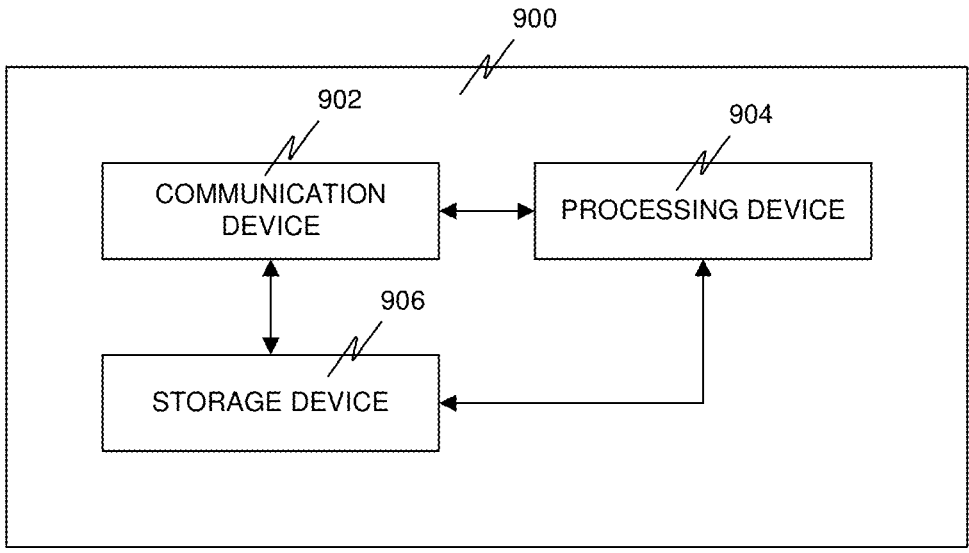
FIG. 9 illustrates a block diagram of a system 900 of facilitating controlling access to data, in accordance with some embodiments.

FIG. 9 illustrates a block diagram of a system 900 of facilitating controlling access to data, in accordance with some embodiments.

Accordingly, the system 900 may include a communication device 902. Moreover, the communication device 902 may be configured for receiving an access request for accessing at least a portion of a data from an entity. Furthermore, the access request includes one or more data identifiers for identifying at least the portion of the data and one or more permissions for permitting the entity for accessing at least the portion of the data. Accordingly, the communication device 902 may be configured for transmitting at least the portion of the data to the entity. Further, the system 900 may include a processing device 904 communicatively coupled with the communication device 902. Additionally, the processing device 904 may be configured for analyzing the access request. Further, the analyzing of the access request may include analyzing the one or more data identifiers using one or more machine learning models. Furthermore, the one or more machine learning models may be configured for identifying data based on data identifiers. Also, the processing device 904 may be configured for identifying a provenance key associated with the data based on the analyzing of the one or more data identifiers. Furthermore, the provenance key may be comprised in the data. Further, the processing device 904 may be configured for analyzing an access control information and the one or more permissions. Additionally, the processing device 904 may be configured for determining an access allowance associated with the data for the access request based on the analyzing of the access control information and the one or more permissions. Also, the processing device 904 may be configured for rendering at least the portion of the data accessible based on the access allowance. Further, the system 900 may include a storage device 906 communicatively coupled with the processing device 904. Furthermore, the storage device 906 may be configured for retrieving the access control information associated with the data based on the provenance key.

Figure 10:
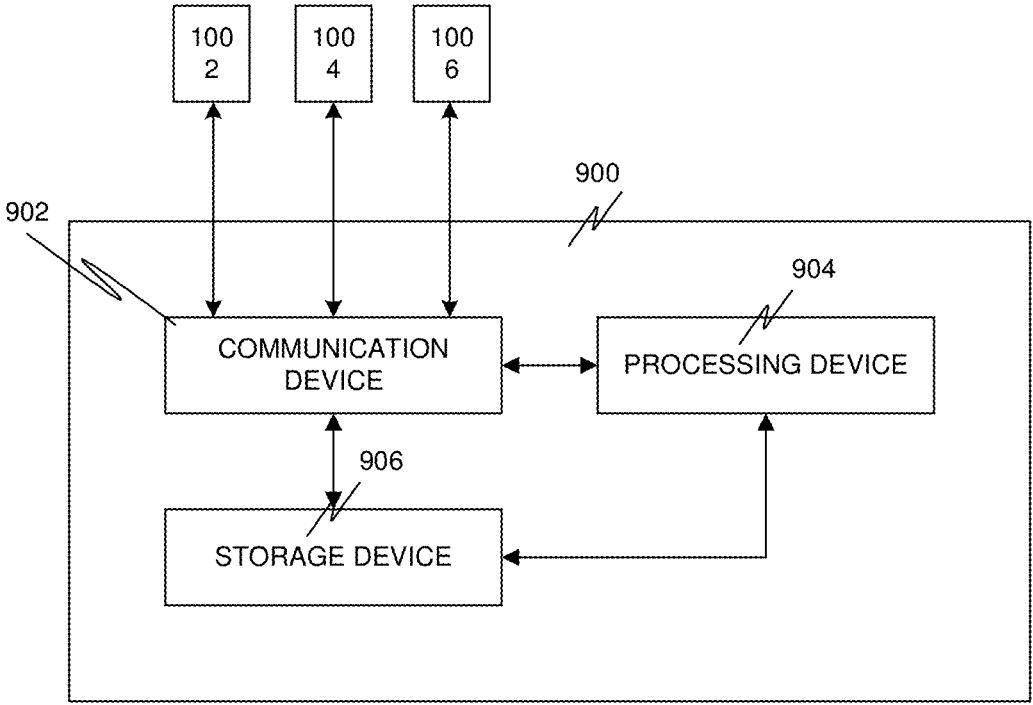
FIG. 10 illustrates a block diagram of the system 900 of facilitating controlling access to data, in accordance with some embodiments.

Accordingly, the communication device 902 may be further configured for receiving a modification in the one or more permissions associated with the entity from one or more devices 1002 (as shown in FIG. 10) associated with one or more authorized entities. Further, the communication device 902 may be configured for transmitting an alert to a data administrator device 1004 (as shown in FIG. 10) associated with a data administrator. Additionally, the storage device 906 may be configured for retrieving two or more access control information associated with two or more data. Furthermore, the processing device 904 may be configured for analyzing the plurality of access control information based on the modification. Further, the processing device 904 may be configured for identifying at least one of the plurality of data impacted by the modification in the at least one authorization associated with the entity based on the analyzing of the plurality of access control information. Further, the processing device 904 may be configured for identifying the data administrator associated with each of one or more of the two or more data using an access control information of each of one or more of the two or more data based on the identifying of one or more of the two or more data. Furthermore, the processing device 904 may be further configured for generating the alert associated with an amendment in the access control information of each of one or more of the two or more data for the data administrator based on the identifying of the data administrator. Furthermore, the processing device 904 may be configured for creating an entry of an open status of the alert in a ledger based on the generating of the alert.

In some embodiments, the processing device 904 may be further configured for creating an entry of a closed status of the alert in the ledger based on the completed status.

Further, in some embodiments, the processing device 904 may be configured for executing one or more operations based on one or more operation executing protocols based on the generating of the alert. Furthermore, the processing device 904 may be configured for analyzing the access control information of each of one or more of the two or more data. Moreover, the processing device 904 may be further configured for determining a status of the amendment in the access control information of each of one or more of the two or more data based on the analyzing of the access control information of each of one or more of the two or more data. Further, the status includes a completed status and an uncompleted status. Accordingly, the processing device 904 may be further configured for generating an escalation of the alert associated with the amendment for one or more of one or more additional entities and the data administrator associated with one or more of the two or more data using one or more protocols based on the completed status. Further, the storage device 906 may be configured for retrieving the access control information of each of one or more of the two or more data based on the executing. Further, the communication device 902 may be configured for transmitting the escalation to the data administrator device 1004 and one or more additional entity devices associated with the one or more additional entities.

Furthermore, the communication device 902 may be further configured for receiving one or more raw data from one or more data sources. Also, the processing device 904 may be further configured for analyzing the one or more raw data. Also, the processing device 904 may be further configured for generating one or more data based on the analyzing of the one or more raw data. Also, the one or more data includes the data. Also, the storage device 906 may be configured for storing the one or more data.

In some embodiments, the analyzing of the one or more raw data includes tokenizing the one or more raw data. Additionally, the generating of the one or more data may be further based on the tokenizing.

In some embodiments, the rendering of at least the portion of the data includes detokenizing at least the portion of the data using a security key based on the tokenizing.

Additionally, the processing device 904 may be further configured for determining one or more data characteristics associated with the one or more raw data based on the analyzing of the one or more raw data. Also, the processing device 904 may be further configured for generating one or more provenance keys for the one or more data based on the determining of the one or more data characteristics. Accordingly, the generating of the one or more data may be based on the generating of the one or more provenance keys. Accordingly, the one or more data includes the one or more provenance keys.

Further, in some embodiments, the processing device 904 may be further configured for generating one or more prompts for one or more access control information for the one or more data based on the generating of the one or more data. Further, the communication device 902 may be further configured for transmitting the one or more prompts to one or more data administrator devices 1006 (as shown in FIG. 10) associated with one or more data administrators of the one or more data. Further, the communication device 902 may be configured for receiving the one or more access control information from the one or more data administrator devices 1006. Further, the storage device 906 may be configured for storing the one or more access control information.

In some embodiments, the entity includes one or more users. Moreover, the receiving of the access request for accessing at least the portion of the data from an entity includes receiving the access request for accessing at least the portion of the data from the one or more user devices associated with the one or more users. Moreover, the one or more user devices may be configured for generating the one or more users based on an input from the one or more users.

Further, in some embodiments, the analyzing of the access request may include analyzing the one or more data identifiers using a fuzzy logic model. Further, the processing device 904 may be configured for identifying one or more data strings corresponding to one or more portions of one or more data present in a database based on the analyzing of the one or more data identifiers using the fuzzy logic model. Further, the processing device 904 may be configured for determining an index information for a data string based on a selection of the data string. Further, the rendering of at least the portion of the data may be based on the index information. Further, the communication device 902 may be configured for transmitting the one or more data strings to the entity. Further, the communication device 902 may be configured for receiving the selection of the data string from the one or more data strings from the entity. Further, the data string corresponds to at least the portion of the data.

Further, in some embodiments, the analyzing of the one or more data identifiers using the fuzzy logic model may include creating a search data string for the access request based on the one or more data identifiers. Further, the analyzing of the one or more data identifiers using the fuzzy logic model may include matching the search data string to two or more data strings corresponding to two or more portions of the one or more data using the fuzzy logic model based on the creating. Further, the identifying of the one or more data strings may be based on the matching.

Further, in some embodiments, the communication device 902 may be further configured for receiving a selection of the two or more portions of the one or more data from one or more devices. Further, the processing device 904 may be further configured for executing a tokenization operation for tokenizing the two or more portions of the one or more data based on the selection of the two or more portions. Further, the processing device 904 may be further configured for generating the two or more data strings for the two or more portions of the one or more data based on the executing. Further, the storage device 906 may be further configured for storing the two or more data strings for the two or more portions of the one or more data in the database.

FIG. 10 illustrates a block diagram of the system 900 of facilitating controlling access to data, in accordance with some embodiments.

Figure 11:
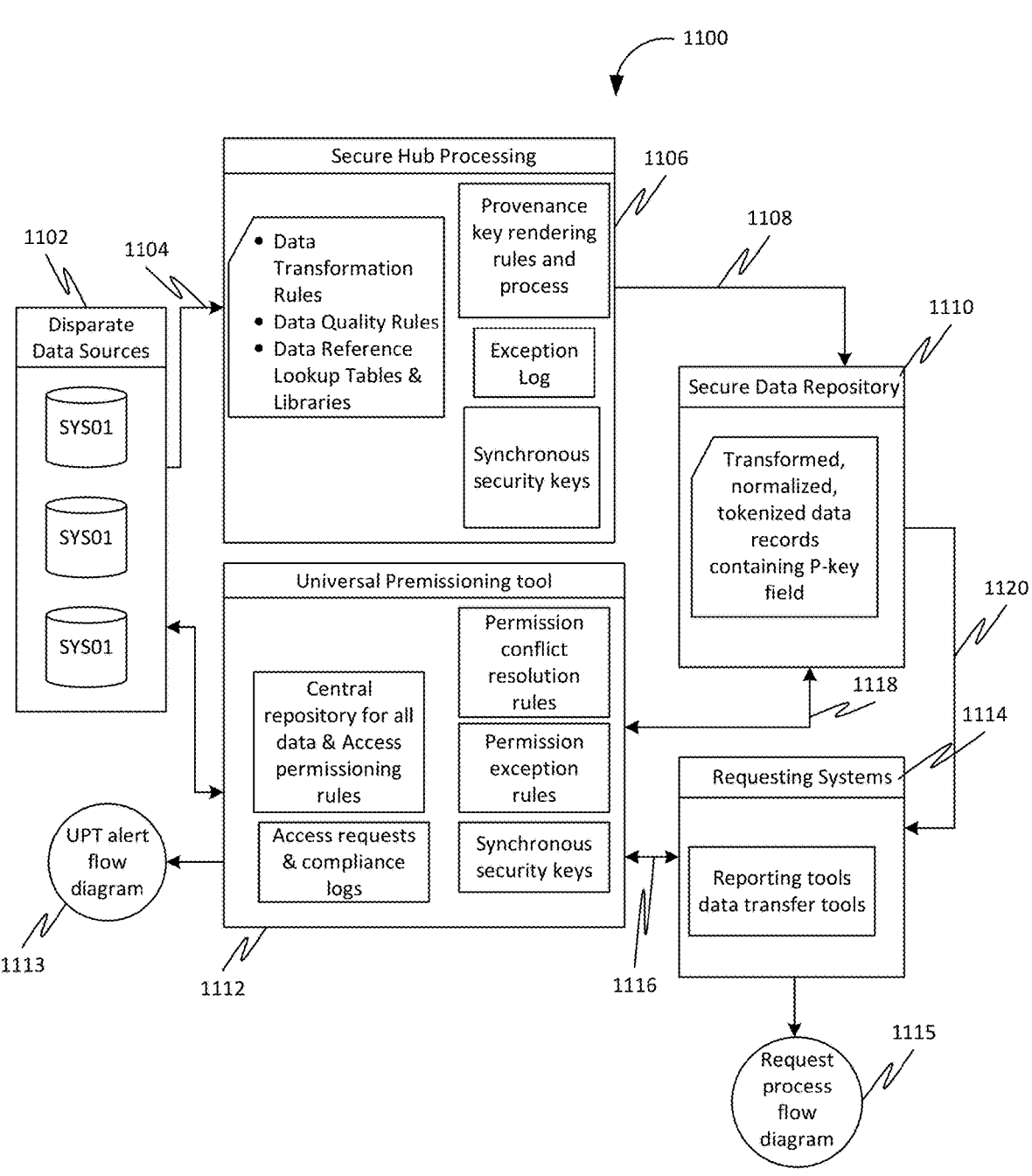
FIG. 11 is a block diagram of a method 1100 of facilitating controlling access to data, in accordance with some embodiments.

FIG. 11 is a block diagram of a method 1100 of facilitating controlling access to data, in accordance with some embodiments. Accordingly, at 1102-1104, the method 1100 may include transferring data to a secure hub via an application programming interface (API), an electronic data interchange (EDI), an enterprise service bus (ESB), or other common commercial data transfer methods. Further, a data source native permission list may be pushed to a universal permissioning tool (UPT) every n minutes. Further, Data-at-Rest in the data sources may be readable at this stage (not yet tokenized or pseudonymized), but encryption end-point security may be in place. Further, at 1106-1108, the method 1100 may include processing inbound records, performing data transformation according to preset data rules and performing data quality checks against preset data rules using data quality and validation rules. Further, the method 1100 may include secure hub processing. Further, the secure hub processing may be based on data transformation rules, data quality rules, and data reference lookup tables and libraries. Further, the secure hub processing may be based on provenance key rendering rules and processes. Further, the secure hub processing may be based on exception logs and synchronous security keys. Further, the method 1100 may include updating the data record being transferred with a Provenance Key ("p-key"). Further, the method 1100 may include encrypting or tokenizing a full record or just specified sensitive fields within the record as it pushes the data record into the secure data repository. Further, at 1110, the method 1100 may include storing the data record (partially or fully encrypted or tokenized) according to the process in the prior step. Further, the data record may be transformed, normalized, tokenized, etc. Further, the data record contains a p-key field. Further, tokenized/encrypted data may not be readable except through a Universal Permissioning Tool interface. Further, the data record may include the p-key as a field or fields within the record. The p-key travels with and is stored as part of the physical data record or meta data. Further, a repository may not be directly accessible to human users; only through calls run through the Universal Permissioning Tool by using synchronous security keys. Further, at 1112, the method 1100 may use the Universal Permission Tool ("UPT") serving as a central repository for roles and permissions for all interconnected, source and target applications, databases, and systems. Further, the method 1100 may include storing the latest data from all source native permissions tables. Further, the method 1100 may include storing exception rules with subsequent triggered actions to allow user access for such roles as executive, administrative, regional manager roles, etc. Further, the method 1100 may include storing permission conflict resolution rules with subsequent triggered actions when a user identification (ID) has different roles in separate interconnected systems. Further, the method 1100 may include reading and decoding the p-key to retrieve the source system information and related native system permission tables. Further, the UPT may act as a gatekeeper to sensitive data by triggering decryption or de-tokenization from the Synchronous Security Keys table(s) on requested data, if permission access is favorably resolved Logs access requests and disposition for Audit & Compliance purposes. Further, the method 1100 may notify security admins of related or interconnected applications, databases, or systems of any UPT logged changes to user roles and status. Further, the method 1100 may include using Artificial Intelligence ("AI") and Machine Learning to monitor, flag, alert, and log user permission and role discrepancies and conflicts across an enterprise landscape. Further, at 1114-1120, data may or may not be delivered as requested by the application or the query tool after the Universal Permissioning Tool has processed the request. Further, depending on the result of the UPT, the method 1100 may include checking that all data can be fully blocked or partially blocked, or data requested can be delivered and be fully visible and human or machine-readable, or UPT can deliver data in multiple predetermined formats. Further, certain restricted data may be rendered as masked, hashed, or tokenized with non-restricted data appearing as visible/readable. Further, the UPT may be based on the central repository for all data and access permissioning rules. Further, the UPT may be based on permission conflict resolution rules and permission exception rules. Further, the UPT may use synchronous security keys. Further, after 1112, the method 1100 may proceed to 1113. Further, at 1114, the method 1100 may include using reporting tools data, and data transfer tools. Further, after 1114, the method 1100 may proceed to 1115. Further, at 1122, the method 1100 may include requesting data via query applications, reporting tools, or other interfaces. Further, at 1124, the method 1100 may include reading, decoding, and referencing the p-key contained within the data record or data object meta request within the Universal Permission Tool. Further, at 1126, the method 1100 may include the UPT system dynamically rendering a binary decision about whether or not the data should be allowed to be accessed as part of this particular data request based on the source system permissioning tables, permission rules, permission conflict rules & exception rules. Further, at 1128, the method 1100 may include using the data request, determining process rules and references, and logging the resulting decision(s) for audit and compliance purposes. Further, at 1130, the method 1100 may include the UPT rendering the data visible by applying the stored synchronous security keys for sensitive data approved for de-tokenization or decryption. Further, at 1132, the method may include releasing allowable data to the requesting system, interface, etc. in a readable format, together with any data still deemed "restricted" that may appear as hashed, dummy data, or non-decipherable data. Further, businesses may be constantly hiring, terminating, transferring, and promoting their personnel, and it struggle to keep up with these changes in a timely, efficient, and compliant manner. Further, at 1134, the method may include the UPT serving as a single point of reference and orchestration for all user access changes within an organization's digital ecosystem. When a user's employment status, home or office geo-location, role, or permission is changed, authorized persons or systems from Human Resources or other departments such as Information Technology or Info Security can record these changes in the UPT. Further, at 1136, the method 1100 may include the UPT creating an open "Permission Change Alert" issue. Further, at 1138, the method 1100 may include the UPT referencing the internally stored Permission Tables pulled from the ecosystem's source and interfacing systems to determine what systems are impacted by this user role/status change. Further, the UPT may be configured to send a communication to the system administrator(s) of the systems requiring an update to their internal permissioning tables. Further, at 1140, the method may include the UPT checking for the anticipated change to the source system permissioning tables since the UPT periodically writes updated Source System Permission Table data. Further, if the UPT does not detect the expected change in the source system permission tables, then at 1142, the method 1100 may include escalating a permission change alert with warnings communicated to the source system admin, their leadership, information technology leads, info security group, etc. as per pre-determined escalation and orchestration protocols. Further, when the UPT detects an expected change in the source system permission tables, then at 1144, the method 1100 may include marking the Change Alert process as "closed".

Figure 12:
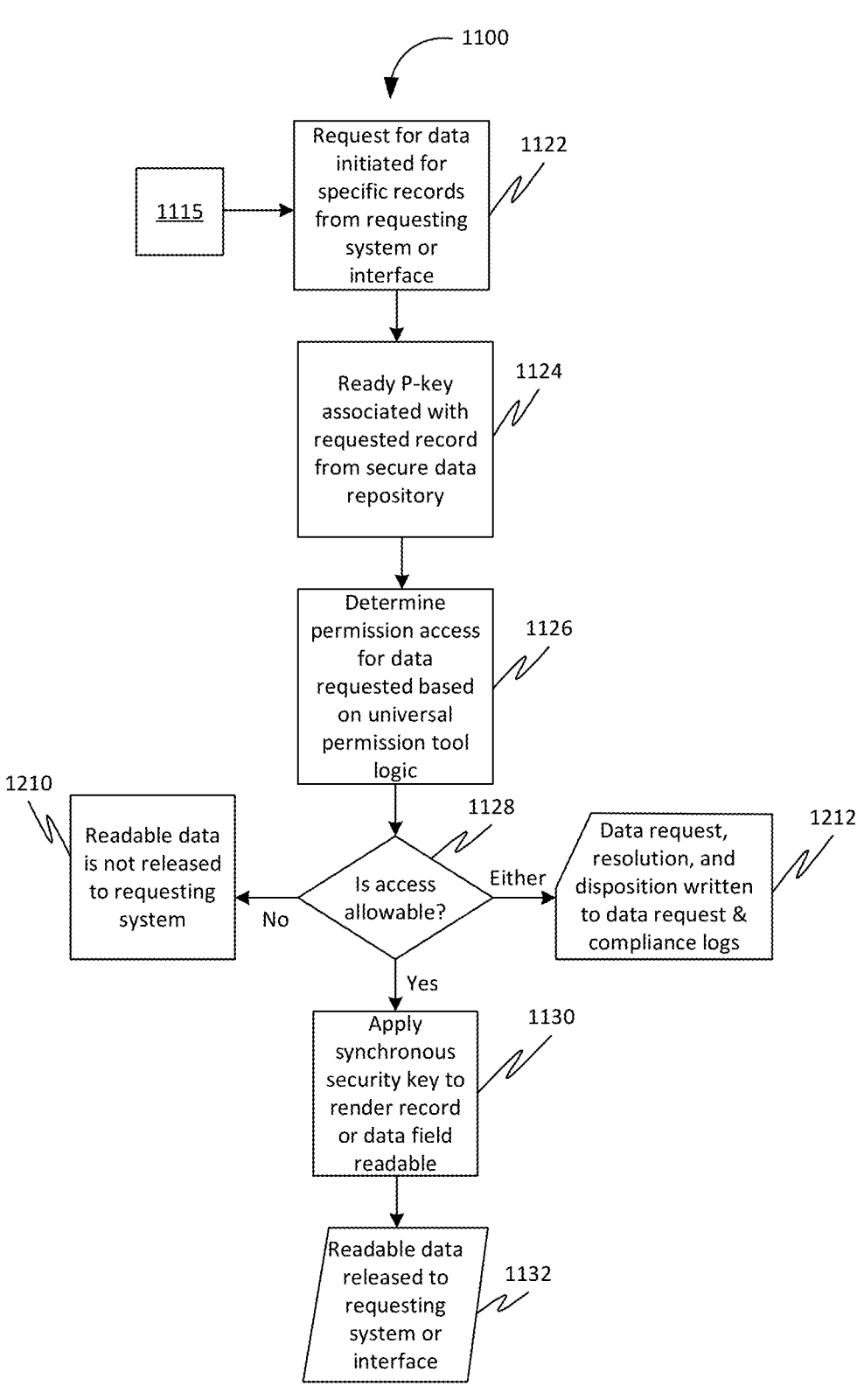
FIG. 12 is a continuation flow diagram of the method 1100 of facilitating controlling access to data, in accordance with some embodiments.

FIG. 12 is a continuation flow diagram of the method 1100 of facilitating controlling access to data, in accordance with some embodiments. Accordingly, at 1122, the method 1100 may include initiating a request for data for specific records from requesting system or interface. Further, at 1124, the method 1100 may include associating a ready P-key with the requested record from the secure data repository. Further, at 1126, the method 1100 may include determining a permission access for data requested based on universal permission tool logic. Further, at 1128, the method 1100 may include checking if the access is allowable. Further, if the access is not allowable, at 1210, the method 1100 may include preventing the release of the data to the requested system. Further, if the access is either allowable or not, at 1212, the method 1100 may include writing data requests, resolutions, and dispositions to the data request and compliance logs. Further, if the access is allowable, at 1130, the method 1100 may include applying the synchronous security key to the render record or data field readable. Further, at 1132, the method 1100 may include releasing the readable data to the requesting system or interface.

Figure 13:
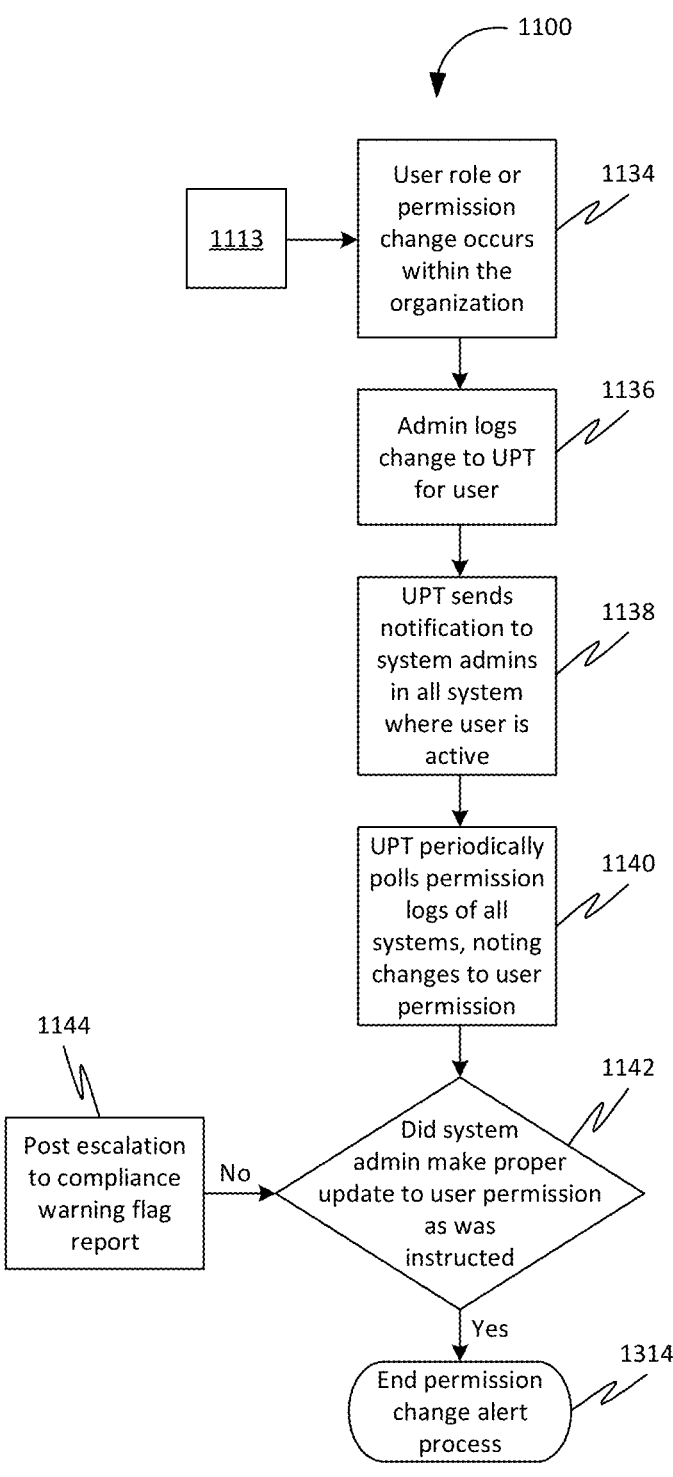
FIG. 13 is a continuation flow diagram of the method 1100 of facilitating controlling access to data, in accordance with some embodiments.

FIG. 13 is a continuation flow diagram of the method 1100 of facilitating controlling access to data, in accordance with some embodiments. Accordingly, at 1134, the method 1100 may include changing a user role or permission within the organization. Further, at 1136, the method 1100 may include changing admin logs to UPT for the user. Further, at 1138, the method 1100 may include the UPT sending a notification to system admins in all systems where the user is active. Further, at 1140, the method 1100 may include the UPT periodically polling permission logs of all systems and noting changes to the user permission. Further, at 1142, the method 1100 may include checking if the system admin made a proper update to the user permission as the system admin was instructed. Further, if the system admin made a proper update to the user permission as the system admin was instructed, at 1314, the method 1100 may include the end permission changing alert process. Further, if the system admin didn't make a proper update to the user permission as the system admin was instructed, at 1144, the method 1100 may include a post escalation to compliance warning flag report.

Figure 14:
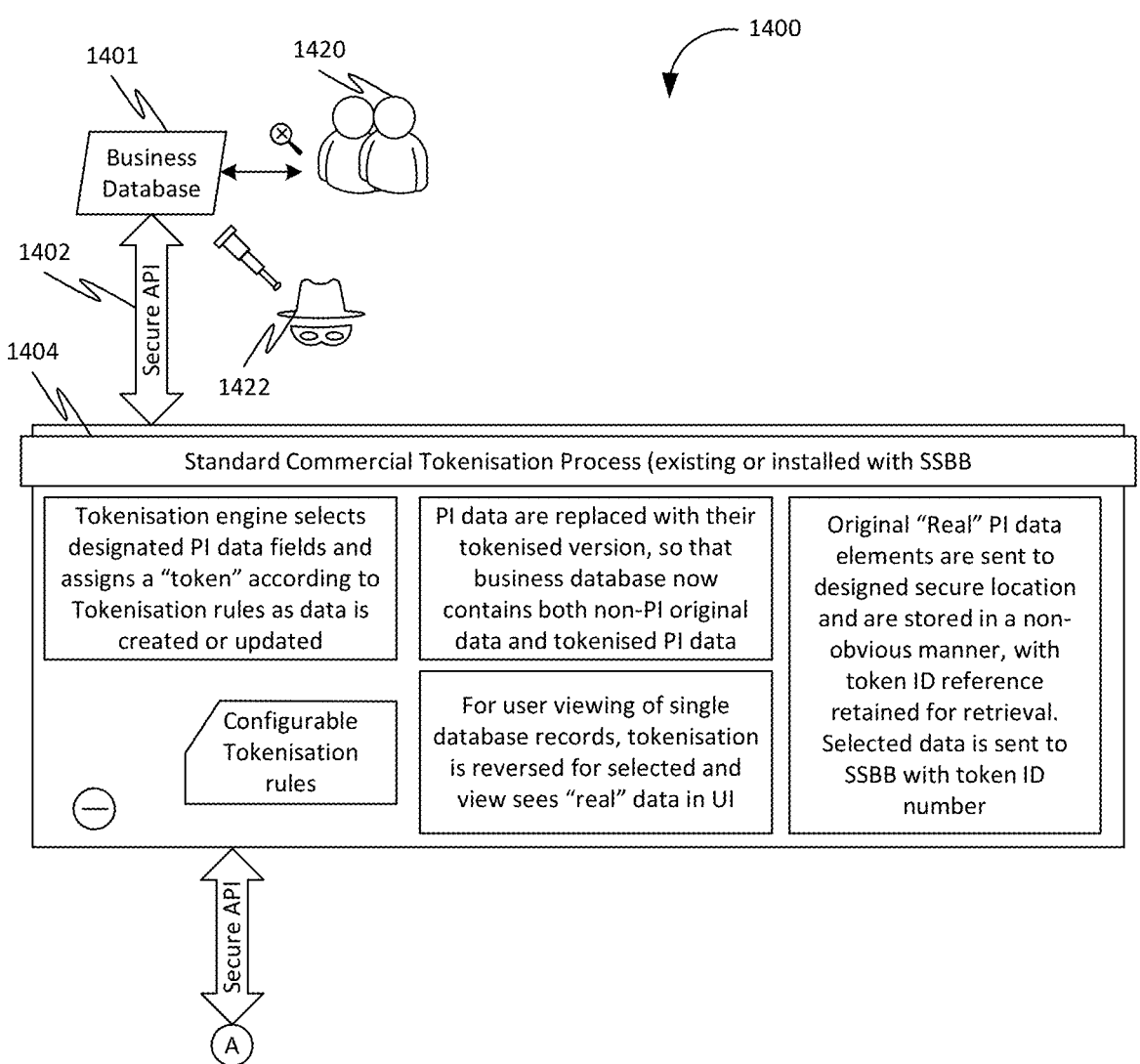
FIG. 14 is a flow diagram of a method 1400 for facilitating controlling access to data, in accordance with some embodiments.

FIG. 14 is a flow diagram of a method 1400 for facilitating controlling access to data, in accordance with some embodiments. Accordingly, the method 1400 may include using a business (system) database 1401 that may be SQL, MS Access, AS400, or even a more modern column store data storage container that a business desires to make more secure. Further, at 1402, the method 1400 may include a secure application programming interface (API) connecting the business database 1401 to the tokenizing application is used to send and receive records between the database and the tokenization application. Further, data transfer calls may be triggered from a software command from a variety of applications connected to the business database 1401 including middleware, enterprise resource planning (ERP), or command within the business database 1401 itself. Further, at 1404, the method 1400 may include a standard commercial tokenization application process applied to selected fields according to configurable tokenization rules. The record/field data inside the Business Database in (1) may be swapped out with indecipherable data. Further, a tokenization engine selects designated personal information (PI) data fields and assigns a "token" according to tokenization rules as data is created or updated. Further, PI data may be replaced with their tokenized version, so that the business database now contains both non-PI original data and tokenized PI data. Further, for user viewing of single database records, the tokenization may be reversed for selected and view sees real data in a user interface (UI). Further, original real PI data elements may be sent to a designed secure location and may be stored in a non-obvious manner, with token ID reference retained for retrieval. Further, selected data may be sent to Secure Search Black Box (SSBB) with a token ID number. Further, as data is tokenized, at 1406, the method 1400 may include assigning a token ID so the system has a way to connect the real data to the tokenized data. Further, the token ID may be associated and stored with the encrypted data. The real data may store in an alternative storage location. To add additional protections, the real data may be dispersed across multiple locations and further disassociated to reduce the ability to read and derive any meaningful value from the real data until it is later "reconstituted" with the tokenization process. No external applications may be attached directly to this database. An intruder may not be able to exfiltrate any meaningful data since the data is not stored contiguously. Further, designated encrypted alternative storage locations (Real data) may be dispersed & disassociated. Further, as the tokenization process is triggered and the "real" data is sent to the alternative storage, at 1408, the method 1400 may include sending a portion of the data (constructed as per pre-defined configurable rules) to the Secure Search Black Box process. Further, at 1410, the method 1400 may include the SSBB Storage process trimming and storing the data according to synchronous rules that dictate what portion of each data string may be assembled into pre-built search strings. The strings are encrypted and associated with the Token ID already assigned. They may be used for comparison to subsequent user search requests. Unneeded data may not be retained or processed further. Further, a SSBB engine may consume designated PI data elements & trims PI string according to SSBB storage rules. Further, trimmed PI data string may be encrypted and associated with Token ID stored. Further, the secure black box may be based on configurable SSBB storage rules (synchronous). Further, the method 1400 may include capturing, encrypting, and storing an audit log of all searches and results.

Further, at 1412, the method 1400 may include storing the parsed and encrypted pre-assembled SSBB strings with the corresponding Token ID. The data repository of pre-assemble strings may be the source for comparison to similarly prepared strings from the user queries. No external applications may be attached to this set of data. Further, the method 1400 may be associated with a designated encrypted search string storage location.

Further, at 1413, the method 1400 may include receiving a business user query for data using a SSBB App UI layer.

Further, at 1414, the method 1400 may include the users entering their desired search data into the User Search Input Form. All searches entered and results found are stored through the SSBB Storage and Retrieval Process (Step 6 and stored for audibility and AI-improvement purposes in the Designated Encrypted Search String Storage Location (Step 7).

Further, at 1416, using the same (synchronous) SSBB Storage Rules, the method 1400 may include parsing and prepping data in the User Search Input Form into search strings for comparison to the pre-assembled SSBB Search Strings in Step 7 using Fuzzy Match logic, resulting in a calculated level-of-confidence score used to rank the record comparison results. The Secure Search Black Box Process may also contain a wide variety of libraries and configurable input and output suggestion routines (such as substitutable values like William, Will, Bill, Billy, etc.). Further, the SSBB engine receives user input search elements and assembles query string according to SSBB storage rules and is encrypted. Further, trimmed PI data strings may be associated with their tokenised ID. Further, the SSBB search may be based on configurable SSBB storage rules (Synchronous), Configurable AI fuzzy match rules, and configurable auto suggestion rules. Further, libraries associated with phonetic pronunciation neutral search terms may suggest spellings customer service bot and verbal scripts. Further, at 1417, the method 1400 may include assessing, scoring, and ranking the matching strings based on limitations of configuration settings. A limited x number of records may be designated for retrieval and temporary de-tokenisation. A limited x number of real data records and field data is temporarily displayed in SSBB UI for evaluation by the business user with the associated index to unlock a full record in the business database. Further, at 1418, the method 1400 may include displaying resulting search results in the Scored, Limited Search Results for evaluation by the user, based on the configurable AI Fuzzy Match Rules. Further, SSBB may suggest various alternative terms, pronunciations, spellings, validations, verbal script language, etc. according to subscription plan configuration and available libraries. Further, business users may view limited temporary displays and select a best record that may be used to de-tokenize real data records viewable in the business database. Further, once users select the resulting suggested match(es) as the correct "found" record, at 1420, the method 1400 may include providing the index data to unlock and display the full data record (and only that record's data) in the Business database. Without this index-selected information, all the other PI data in the business database remains tokenized and of no value to uninvited database intruders. The regular wide-open search functionality may be turned off in the business database, and the user must restrict their search to the user search input form in Step 8. Further, the business users may retrieve and view/modify a record in their system using existing UX only if the business users have the actual index data (e.g. customer) Wide-open system search is locked. Further, at 1422, bad actors targeting the Business data for viewing and exfiltration may be unable to view the PI data in the business database because that PI data is non-sensical token, and mass search functions are turned off. There may be no access to any of the tokenisation of SSBB repositories, and all data contained within is disassociated and encrypted. Additionally, there is no value in the Designated Encrypted Alternative Storage Location of the "real" data because that data is dispersed and disassociated and is not connected to any external software applications.

Figure 15:
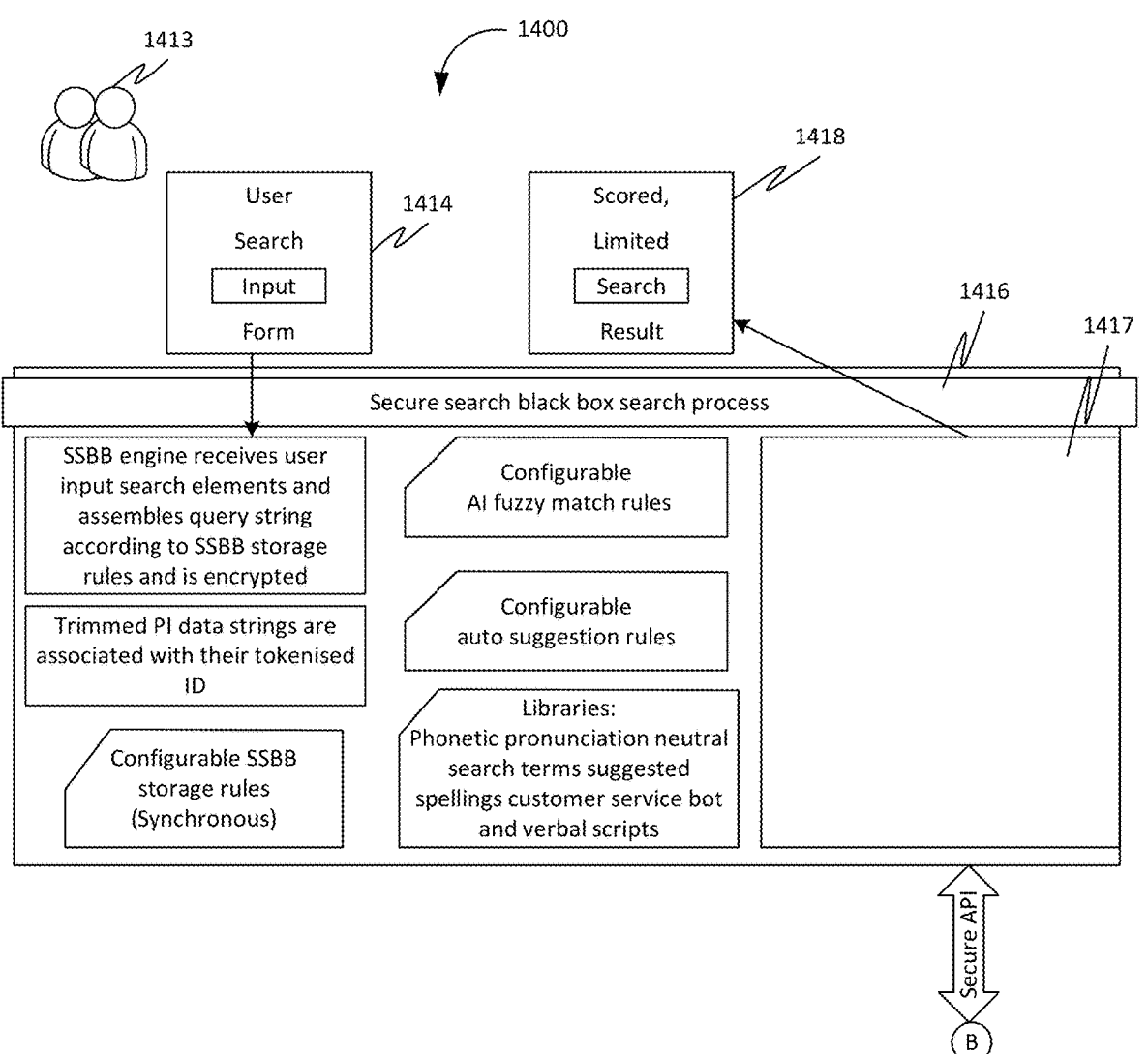
FIG. 15 is a continuous flow diagram of the method 1400 for facilitating controlling access to data, in accordance with some embodiments.

FIG. 15 is a continuous flow diagram of the method 1400 for facilitating controlling access to data, in accordance with some embodiments.

Figure 16:
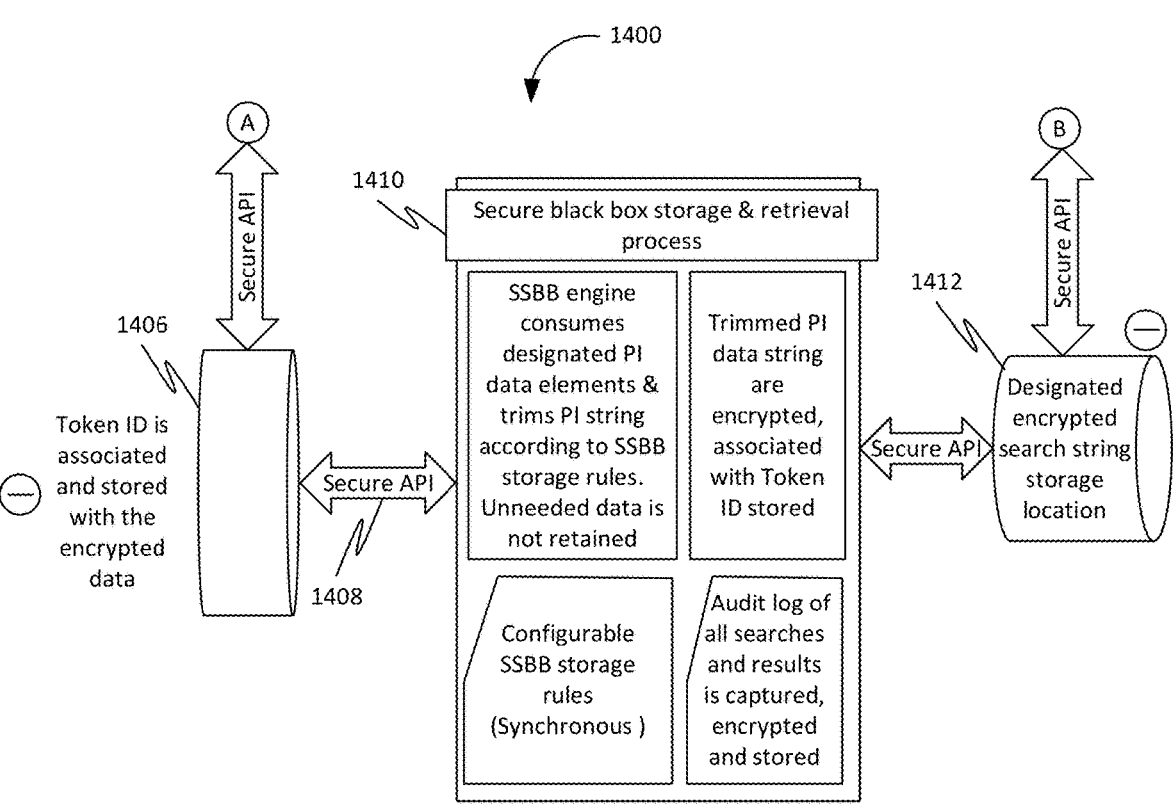
FIG. 16 is a continuous flow diagram of the method 1400 for facilitating controlling access to data, in accordance with some embodiments.

FIG. 16 is a continuous flow diagram of the method 1400 for facilitating controlling access to data, in accordance with some embodiments.

FIG. 17 is a tabular representation 1700 of a secure search black box technology (SSBB) of facilitating access to data, in accordance with some embodiments. Accordingly, at 1701, the tabular representation 1700 may include original data (as input into the business database). Further, at 1702, the tabular representation 1700 may include an example of a configurable tokenization rule. Further, at 1704, the tabular representation 1700 may include tokenized data according to proprietary configurable algorithmic tokenization rules. Further, at 1706, the tabular representation 1700 may include token ID. Further, at 1708, the tabular representation 1700 may include SSBB parse string process. Further, based on the Configurable SSBB synchronous Rules, selected elements of the real data are parsed and placed into pre-Assembled SSBB Strings. Further, at 1710, the tabular representation 1700 may include assembled SSBB string comprising a depiction of a quick search string assembly. Further, at 1712, the tabular representation 1700 may include user query input search. Further, at 1714, the tabular representation 1700 may include an example of how data is parsed and prepped according to synchronous SSBB Storage rules. Further, at 1716, the tabular representation 1700 may include an assembled user query string that may be used to compare to Assemble SSBB string. Further, at 1718, the tabular representation 1700 may include a level of confidence in the match of string in user query input prepared search string to the assembled SSBB string. Further, at 1720, the tabular representation 1700 may include a token ID of the matched record. Further, at 1722, the tabular representation 1700 may include values returned in the scored limited search results.

FIG. 18 is the tabular representation 1700 of the secure search black box technology (SSBB) of facilitating access to data, in accordance with some embodiments.

FIG. 19 is the tabular representation 1700 of the secure search black box technology (SSBB) of facilitating access to data, in accordance with some embodiments.

FIG. 20 is the tabular representation 1700 of the secure search black box technology (SSBB) of facilitating access to data, in accordance with some embodiments.

FIG. 21 is a flow diagram of a method 2100 for facilitating controlling access to data, in accordance with some embodiments.

Further, in some embodiments, the analyzing of the access request may include analyzing the one or more data identifiers using a fuzzy logic model. Further, at 2102, the method 2100 may include identifying, using the processing device, one or more data strings corresponding to one or more portions of one or more data present in a database based on the analyzing of the one or more data identifiers using the fuzzy logic model. Further, at 2104, the method 2100 may include transmitting, using the communication device, the one or more data strings to the entity. Further, at 2106, the method 2100 may include receiving, using the communication device, a selection of a data string from the one or more data strings from the entity. Further, the data string corresponds to at least the portion of the data. Further, at 2108, the method 2100 may include determining, using the processing device, an index information for the data string based on the selection of the data string. Further, the rendering of at least the portion of the data may be based on the index information.

Further, in some embodiments, the analyzing of the one or more data identifiers using the fuzzy logic model may include creating a search data string for the access request based on the one or more data identifiers. Further, the analyzing of the one or more data identifiers using the fuzzy logic model may include matching the search data string to two or more data strings corresponding to two or more portions of the one or more data using the fuzzy logic model based on the creating. Further, the fuzzy logic model may include Fuzzy Match logic. Further, the identifying of the one or more data strings may be based on the matching.

FIG. 22 is a flow diagram of a method 2200 for facilitating controlling access to data, in accordance with some embodiments.

Further, in some embodiments, at 2202, the method 2200 may include receiving, using the communication device, a selection of the two or more portions of the one or more data from one or more devices. Further, in some embodiments, at 2204, the method 2200 may include executing, using the processing device, a tokenization operation for tokenizing the two or more portions of the one or more data based on the selection of the two or more portions. Further, the tokenization operation (tokenization process) may include sending the two or more portions of the one or more data to a designed secure data storing location (database) and storing in a non-obvious manner, with a token ID reference retained for retrieval. Further, the tokenization operation may include creating tokenized two or more portions of the one or more data and assigning two or more token identifications (IDs) to the two or more portions of the one or more data. Further, in some embodiments, at 2206, the method 2200 may include generating, using the processing device, the two or more data strings (pre-stored strings) for the two or more portions of the one or more data based on the executing. Further, in some embodiments, at 2208, the method 2200 may include storing, using the storage device, the two or more data strings for the two or more portions of the one or more data in the database.

Although the invention has been explained in relation to its preferred embodiment, it is to be understood that many other possible modifications and variations can be made without departing from the spirit and scope of the invention as hereinafter claimed.

The invention claimed is:

1. A method of facilitating controlling access to data, wherein the method comprises:

receiving, using a communication device, an access request for accessing at least a portion of a data from an entity, wherein the data is unreadable, wherein the access request comprises at least one data identifier for identifying at least the portion of the data and at least one permission for permitting the entity for accessing at least the portion of the data, wherein the data comprises at least one data element corresponding to at least one field of the data, wherein at least the portion of the data corresponds to a data element present in a field of the data;

analyzing, using a processing device, the access request, wherein the analyzing of the access request comprises analyzing the at least one data identifier using at least one machine learning model, wherein the at least one machine learning model is configured for identifying data based on data identifiers;

identifying, using the processing device, a provenance key associated with the data based on the analyzing of the at least one data identifier, wherein the provenance key is comprised in the data as a field of the data;

retrieving, using a storage device, an access control information associated with the data based on the provenance key;

analyzing, using the processing device, the access control information and the at least one permission, wherein the analyzing of the access control information comprises validating the at least one permission of the entity to access at least the portion of the data using the access control information;

determining, using the processing device, an access allowance associated with the data for the access request based on the analyzing of the access control information and the at least one permission;

rendering, using the processing device, at least the portion of the data accessible based on the access allowance, wherein the rendering of at least the portion of the data makes at least the portion of the data readable to the entity; and transmitting, using the communication device, at least the portion of the data to the entity.

2. The method of claim 1 wherein further comprises:

receiving, using the communication device, a modification in the at least one permission associated with the entity from at least one device associated with at least one authorized entity, wherein the modification corresponds to a change in an authorization of the entity to access at least one data;

retrieving, using the storage device, a plurality of access control information associated with a plurality of data;

analyzing, using the processing device, the plurality of access control information based on the modification;

identifying, using the processing device, at least one of the plurality of data impacted by the modification in the at least one authorization associated with the entity based on the analyzing of the plurality of access control information;

identifying, using the processing device, a data administrator associated with each of at least one of the plurality of data using an access control information of each of at least one of the plurality of data based on the identifying of at least one of the plurality of data;

generating, using the processing device, an alert associated with an amendment in the access control information of each of at least one of the plurality of data for the data administrator based on the identifying of the data administrator;

transmitting, using the communication device, the alert to a data administrator device associated with the data administrator; and creating, using the processing device, an entry of an open status of the alert in a ledger based on the generating of the alert.

3. The method of claim 2 wherein further comprises:

executing, using the processing device, at least one operation based on at least one operation executing protocol based on the generating of the alert, wherein the at least one operation comprises checking the access control information of each of at least one of the plurality of data for the amendment;

retrieving, using the storage device, the access control information of each of at least one of the plurality of data based on the executing;

analyzing, using the processing device, the access control information of each of at least one of the plurality of data;

determining, using the processing device, a status of the amendment in the access control information of each of at least one of the plurality of data based on the analyzing of the access control information of each of at least one of the plurality of data, wherein the status comprises a completed status and an uncompleted status;

generating, using the processing device, an escalation of the alert associated with the amendment for at least one of at least one additional entity and the data administrator associated with at least one of the plurality of data using at least one protocol based on the completed status; and transmitting, using the communication device, the escalation to the data administrator device and at least one additional entity device associated with the at least one additional entity.

4. The method of claim 1 further comprises:

receiving, using the communication device, at least one raw data from at least one data source;

analyzing, using the processing device, the at least one raw data;

determining, using the processing device, at least one data characteristic associated with the at least one raw data based on the analyzing of the at least one raw data;

generating, using the processing device, at least one data based on the analyzing of the at least one raw data, wherein the at least one data comprises the data;

generating, using the processing device, at least one provenance key for the at least one data based on the determining of the at least one data characteristic, wherein the generating of the at least one data is based on the generating of the at least one provenance key, wherein the at least one data comprises the at least one provenance key; and storing, using the storage device, the at least one data.

5. The method of claim 4, wherein the analyzing of the at least one raw data comprises tokenizing the at least one raw data, wherein the generating of the at least one data is further based on the tokenizing.

6. The method of claim 4, wherein the rendering of at least the portion of the data comprises detokenizing at least the portion of the data using a security key based on the tokenizing.

7. The method of claim 4 further comprises:

generating, using the processing device, at least one prompt for at least one access control information for the at least one data based on the generating of the at least one data;

transmitting, using the communication device, the at least one prompt to at least one data administrator device associated with at least one data administrator of the at least one data;

receiving, using the communication device, the at least one access control information from the at least one data administrator device; and storing, using the storage device, the at least one access control information.

8. The method of claim 1, wherein the analyzing of the access request further comprises analyzing the at least one data identifier using a fuzzy logic model, wherein the method further comprises:

identifying, using the processing device, at least one data string corresponding to at least one portion of at least one data present in a database based on the analyzing of the at least one data identifier using the fuzzy logic model;

transmitting, using the communication device, the at least one data string to the entity;

receiving, using the communication device, a selection of a data string from the at least one data string from the entity, wherein the data string corresponds to at least the portion of the data; and determining, using the processing device, an index information for the data string based on the selection of the data string, wherein the rendering of at least the portion of the data is further based on the index information.

9. The method of claim 8, wherein the analyzing of the at least one data identifier using the fuzzy logic model comprises:

creating a search data string for the access request based on the at least one data identifier; and matching the search data string to a plurality of data strings corresponding to a plurality of portions of the at least one data using the fuzzy logic model based on the creating, wherein the identifying of the at least one data string is further based on the matching.

10. The method of claim 9 further comprises:

receiving, using the communication device, a selection of the plurality of portions of the at least one data from at least one device;

executing, using the processing device, a tokenization operation for tokenizing the plurality of portions of the at least one data based on the selection of the plurality of portions;

generating, using the processing device, the plurality of data strings for the plurality of portions of the at least one data based on the executing; and storing, using the storage device, the plurality of data strings for the plurality of portions of the at least one data in the database.

11. A system for facilitating controlling access to data, the system comprising:

a communication device configured for:

receiving an access request for accessing at least a portion of a data from an entity, wherein the data is unreadable, wherein the access request comprises at least one data identifier for identifying at least the portion of the data and at least one permission for permitting the entity for accessing at least the portion of the data, wherein the data comprises at least one data element corresponding to at least one field of the data, wherein at least the portion of the data corresponds to a data element present in a field of the data; and transmitting at least the portion of the data to the entity;

a processing device communicatively coupled with the communication device, wherein the processing device is configured for:

analyzing the access request, wherein the analyzing of the access request comprises analyzing the at least one data identifier using at least one machine learning model, wherein the at least one machine learning model is configured for identifying data based on data identifiers;

identifying a provenance key associated with the data based on the analyzing of the at least one data identifier, wherein the provenance key is comprised in the data as a field of the data;

analyzing an access control information and the at least one permission, wherein the analyzing of the access control information comprises validating the at least one permission of the entity to access at least the portion of the data using the access control information;

determining an access allowance associated with the data for the access request based on the analyzing of the access control information and the at least one permission; and rendering at least the portion of the data accessible based on the access allowance, wherein the rendering of at least the portion of the data makes at least the portion of the data readable to the entity; and a storage device communicatively coupled with the processing device, wherein the storage device is configured for retrieving the access control information associated with the data based on the provenance key.

12. The system of claim 11, wherein the communication device is further configured for:

receiving a modification in the at least one permission associated with the entity from at least one device associated with at least one authorized entity, wherein the modification corresponds to a change in an authorization of the entity to access at least one data; and transmitting an alert to a data administrator device associated with a data administrator, wherein the storage device is further configured for retrieving a plurality of access control information associated with a plurality of data, wherein the processing device is further configured for:

analyzing the plurality of access control information based on the modification;

identifying at least one of the plurality of data impacted by the modification in the at least one authorization associated with the entity based on the analyzing of the plurality of access control information;

identifying the data administrator associated with each of at least one of the plurality of data using an access control information of each of at least one of the plurality of data based on the identifying of at least one of the plurality of data;

generating the alert associated with an amendment in the access control information of each of at least one of the plurality of data for the data administrator based on the identifying of the data administrator; and creating an entry of an open status of the alert in a ledger based on the generating of the alert.

13. The system of claim 12, wherein the processing device is further configured for:

executing at least one operation based on at least one operation executing protocol based on the generating of the alert, wherein the at least one operation comprises checking the access control information of each of at least one of the plurality of data for the amendment;

analyzing the access control information of each of at least one of the plurality of data;

determining a status of the amendment in the access control information of each of at least one of the plurality of data based on the analyzing of the access control information of each of at least one of the plurality of data, wherein the status comprises a completed status and an uncompleted status; and generating an escalation of the alert associated with the amendment for at least one of at least one additional entity and the data administrator associated with at least one of the plurality of data using at least one protocol based on the completed status, wherein the storage device is further configured for retrieving the access control information of each of at least one of the plurality of data based on the executing, wherein the communication device is further configured for transmitting the escalation to the data administrator device and at least one additional entity device associated with the at least one additional entity.

14. The system of claim 11, wherein the communication device is further configured for receiving at least one raw data from at least one data source, wherein the processing device is further configured for:

analyzing the at least one raw data;

determining at least one data characteristic associated with the at least one raw data based on the analyzing of the at least one raw data;

generating at least one data based on the analyzing of the at least one raw data, wherein the at least one data comprises the data; and generating at least one provenance key for the at least one data based on the determining of the at least one data characteristic, wherein the generating of the at least one data is based on the generating of the at least one provenance key, wherein the at least one data comprises the at least one provenance key, wherein the storage device is configured for storing the at least one data.

15. The system of claim 14, wherein the analyzing of the at least one raw data comprises tokenizing the at least one raw data, wherein the generating of the at least one data is further based on the tokenizing.

16. The system of claim 14, wherein the rendering of at least the portion of the data comprises detokenizing at least the portion of the data using a security key based on the tokenizing.

17. The system of claim 14, wherein the processing device is further configured for generating at least one prompt for at least one access control information for the at least one data based on the generating of the at least one data, wherein the communication device is further configured for:

transmitting the at least one prompt to at least one data administrator device associated with at least one data administrator of the at least one data; and receiving the at least one access control information from the at least one data administrator device, wherein the storage device is further configured for storing the at least one access control information.

18. The system of claim 11, wherein the analyzing of the access request further comprises analyzing the at least one data identifier using a fuzzy logic model, wherein the processing device is further configured for:

identifying at least one data string corresponding to at least one portion of at least one data present in a database based on the analyzing of the at least one data identifier using the fuzzy logic model; and determining an index information for a data string based on a selection of the data string, wherein the rendering of at least the portion of the data is further based on the index information, wherein the communication device is further configured for:

transmitting the at least one data string to the entity; and receiving the selection of the data string from the at least one data string from the entity, wherein the data string corresponds to at least the portion of the data.

19. The system of claim 18, wherein the analyzing of the at least one data identifier using the fuzzy logic model comprises:

creating a search data string for the access request based on the at least one data identifier; and matching the search data string to a plurality of data strings corresponding to a plurality of portions of the at least one data using the fuzzy logic model based on the creating, wherein the identifying of the at least one data string is further based on the matching.

20. The system of claim 19, wherein the communication device is further configured for receiving a selection of the plurality of portions of the at least one data from at least one device, wherein the processing device is further configured for:

executing a tokenization operation for tokenizing the plurality of portions of the at least one data based on the selection of the plurality of portions; and generating the plurality of data strings for the plurality of portions of the at least one data based on the executing, wherein the storage device is further configured for storing the plurality of data strings for the plurality of portions of the at least one data in the database.

\* \* \* \* \*